United States Patent [19]
Pedersen et al.

[11] Patent Number: 6,134,705
[45] Date of Patent: Oct. 17, 2000

[54] GENERATION OF SUB-NETLISTS FOR USE IN INCREMENTAL COMPILATION

[75] Inventors: Bruce Pedersen, San Jose; Francis B. Heile; Marwan Adel Khalaf, both of Santa Clara; David Wolk Mendel, Sunnyvale, all of Calif.

[73] Assignee: Altera Corporation, San Jose, Calif.

[21] Appl. No.: 08/958,002

[22] Filed: Oct. 27, 1997

Related U.S. Application Data

[60] Provisional application No. 60/029,277, Oct. 28, 1996.

[51] Int. Cl.[7] .................................................. G06F 17/50
[52] U.S. Cl. ..................................... 716/18; 716/2; 716/3
[58] Field of Search ........................... 395/500.1, 500.13, 395/500.02, 500.12; 716/1, 11, 12, 18, 2, 3, 6

[56] References Cited

U.S. PATENT DOCUMENTS

| | | | |
|---|---|---|---|
| 3,617,714 | 11/1971 | Kernighan | 235/150 |
| 4,827,427 | 5/1989 | Hyduke | 364/489 |
| 4,882,690 | 11/1989 | Shinsha et al. | 395/500.19 |
| 5,111,413 | 5/1992 | Lazansky et al. | 364/578 |
| 5,301,318 | 4/1994 | Mittal | 395/600 |
| 5,335,320 | 8/1994 | Iwata et al. | 395/155 |
| 5,341,308 | 8/1994 | Mendel | 364/489 |
| 5,436,849 | 7/1995 | Drumm | 364/490 |
| 5,442,790 | 8/1995 | Nosenchuck | 395/700 |
| 5,473,547 | 12/1995 | Muroga | 364/489 |
| 5,499,192 | 3/1996 | Knapp et al. | 364/489 |
| 5,513,124 | 4/1996 | Trimberger et al. | 364/491 |
| 5,526,517 | 6/1996 | Jones et al. | 395/600 |
| 5,537,295 | 7/1996 | Van Den Bout et al. | 361/767 |
| 5,541,849 | 7/1996 | Rostoker et al. | 364/489 |
| 5,550,782 | 8/1996 | Cliff et al. | 365/230.03 |
| 5,583,759 | 12/1996 | Tredennick et al. | 361/790 |
| 5,636,133 | 6/1997 | Chesebro et al. | 364/491 |
| 5,661,660 | 8/1997 | Freidin | 364/489 |
| 5,670,895 | 9/1997 | Kazarian | 326/39 |
| 5,691,912 | 11/1997 | Duncan | 364/490 |
| 5,696,454 | 12/1997 | Trimberger | 326/38 |
| 5,712,794 | 1/1998 | Hong | 364/491 |
| 5,721,912 | 2/1998 | Stepczyk et al. | 395/633 |
| 5,724,251 | 3/1998 | Heavlin | 364/491 |
| 5,754,441 | 5/1998 | Tokunoh et al. | 364/488 |
| 5,761,079 | 6/1998 | Drumm | 364/489 |
| 5,812,847 | 9/1998 | Joshi et al. | 395/682 |
| 5,825,661 | 10/1998 | Drumm | 364/491 |

(List continued on next page.)

OTHER PUBLICATIONS

Peter Ramyalal Suaris, et al., "A Quadrisection–Based Combined Place and Route Scheme for Standard Cells," Mar. 1989, pp. 234–244, *IEEE*.

Limaiem and Ammar, "A Computer Assisted Process Planning System Based on Optimization Criteria Compromises," *IEEE International Symposium on Assembly and Task Planning*, pp. 101–108, 1995.

Mace and Diamond, "Use of Programmable Logic Devices as an Aid to System Design," *IEEE Colloquium on Programmable Logic Devices for Digital Systems Implementation*, pp. 1/1–1/5, 1990.

Ginetti and Brasen "Modifying the netlist after Placement for Performance Improvement," *1999 IEEE Custom Integrated Circuits Conference*, pp. 9.2.1 through 9.2.4, 1993.

*Primary Examiner*—Paul R. Lintz
*Assistant Examiner*—Leigh Marie Garbowski
*Attorney, Agent, or Firm*—Beyer Weaver & Thomas LLP

[57] ABSTRACT

A technique is disclosed for performing an incremental recompile of an electronic design that has been previous compiled and then changed by a designer. This is accomplished by identifying a "sub-netlist" within the larger netlist of the changed design. The sub-netlist contains the sphere of influence of the designer's changes to the original design. During incremental recompile, only the sub-netlist is compiled; the remainder of the netlist is left as is from the previous compile. After the sub-netlist is synthesized, it is back into the synthesized netlist from the previous compilation. The newly synthesized netlist for the changed design is mapped to logic cells which are then fit onto a target hardware device.

27 Claims, 18 Drawing Sheets integrated

6,134,705
Page 2

U.S. PATENT DOCUMENTS

| | | | |
|---|---|---|---|
| 5,831,863 | 11/1998 | Scepanovic et al. | 364/488 |
| 5,856,926 | 1/1999 | Matsumoto et al. | 364/490 |
| 5,859,776 | 6/1999 | Sato et al. | 364/468.28 |
| 5,867,396 | 2/1999 | Parlour | 364/489 |
| 5,867,399 | 2/1999 | Rostoker et al. | 364/489 |
| 5,870,308 | 2/1999 | Dangelo et al. | 364/489 |
| 5,875,112 | 2/1999 | Lee | 364/489 |
| 5,896,521 | 4/1999 | Shackleford et al. | 395/500 |
| 5,903,475 | 5/1999 | Gupte et al. | 364/578 |

GENERATION OF SUB-NETLISTS FOR USE IN INCREMENTAL COMPILATION

CROSS REFERENCE TO RELATED APPLICATIONS

This application claims priority of provisional U.S. patent application Ser. No. 60/029,277, filed Oct. 28, 1996, entitled "Tools For Designing Programmable Logic Devices" which is incorporated by reference.

This invention is related to U.S. patent application Ser. No. 08/958,436, filed on the same day as this patent application, naming J. Tse et al. as inventors, and entitled "FITTING FOR INCREMENTAL COMPILATION OF ELECTRONIC DESIGNS." That application is incorporated herein by reference in its entirety and for all purposes.

This invention is also related to U.S. patent application Ser. No. 08/958,670, filed on the same day as this patent application, naming D. Mendel as inventor, and entitled "PARALLEL PROCESSING FOR COMPUTER ASSISTED DESIGN OF ELECTRONIC DEVICES." That application is incorporated herein by reference in its entirety and for all purposes.

This invention is also related U.S. patent application Ser. No. 08/958,626, filed on the same day as this patent application, naming F. Heile et al. as inventors, and entitled "INTERFACE FOR COMPILING DESIGN VARIATIONS IN ELECTRONIC DESIGN ENVIRONMENTS." That application is incorporated herein by reference in its entirety and for all purposes.

This invention is also related to U.S. patent application Ser. No. 08/958,778, filed on the same day as this patent application, naming T. Southgate as inventor, and entitled "METHOD AND APPARATUS FOR AUTOMATED CIRCUIT DESIGN." That application is incorporated herein by reference in its entirety and for all purposes.

This invention is also related to U.S. patent application Ser. No. 08/958,434, filed on the same day as this patent application, naming T. Southgate et al. as inventors, and entitled "GRAPHIC EDITOR FOR BLOCK DIAGRAM LEVEL DESIGN OF CIRCUITS." That application is incorporated herein by reference in its entirety and for all purposes.

This invention is also related to U.S. patent application Ser. No. 08/958,432, filed on the same day as this patent application, naming T. Southgate et al. as inventors, and entitled "DESIGN FILE TEMPLATES FOR IMPLEMENTATION OF LOGIC DESIGNS." That application is incorporated herein by reference in its entirety and for all purposes.

This invention is also related to U.S. patent application Ser. No. 08/958,414, filed on the same day as this patent application, naming T. Southgate as inventor, and entitled "METHOD FOR PROVIDING REMOTE SOFTWARE TECHNICAL SUPPORT." That application is incorporated herein by reference in its entirety and for all purposes.

This invention is also related to U.S. patent application Ser. No. 08/958,777, filed on the same day as this patent application, naming T. Southgate as inventor, and entitled "METHOD FOR SIMULATING A CIRCUIT DESIGN." That application is incorporated herein by reference in its entirety and for all purposes.

This invention is also related to U.S. patent application Ser. No. 08/957,957, filed on the same day as this patent application, naming F. Heile et al. as inventors, and entitled "WORKGROUP COMPUTING FOR ELECTRONIC DESIGN AUTOMATION." That application is incorporated herein by reference in its entirety and for all purposes.

This invention is also related to U.S. patent application Ser. No. 08/958,798, filed on the same day as this patent application, naming F. Heile as inventor, and entitled "LOCAL COMPILATION IN CONTEXT WITHIN A DESIGN HIERARCHY." That application is incorporated herein by reference in its entirety and for all purposes.

This invention is also related to U.S. patent application Ser. No. 08/958,435, filed on the same day as this patent application, naming Alan L. Herrmann et al. as inventors, and entitled "EMBEDDED LOGIC ANALYZER FOR A PROGRAMMABLE LOGIC DEVICE." That application is incorporated herein by reference in its entirety and for all purposes.

This invention is also related to U.S. patent application Ser. No. 08/958,431, filed on the same day as this patent application, naming F. Heile as inventor, and entitled "ELECTRONIC DESIGN AUTOMATION TOOL FOR DISPLAY OF DESIGN PROFILE." That application is incorporated herein by reference in its entirety and for all purposes.

BACKGROUND OF THE INVENTION

This invention relates to incremental compilation of changed electronic designs. More specifically, it relates to methods, machine readable media, and apparatuses for delineating the range of influence of a design change in an unsynthesized netlist.

Electronic design automation ("EDA") is becoming increasingly complicated and time consuming, due in part to the greatly increasing size and complexity of the electronic devices designed by EDA tools. Such devices include general purpose microprocessors as well as custom logic devices including Application Specific Integrated Circuits ("ASICs"). Examples of ASICs include non-programmable gate arrays, field programmable gate arrays ("FPGAs"), and complex programmable logic devices ("PLDs" or "CPLDs"). The design of even the simplest of these devices typically involves generation of a high level design, logic simulation, generation of a network, timing simulation, etc. Usually, timing stimulation cannot be performed until the design has been compiled to the point where the various gate level entities are synthesized and placed and the lines therebetween routed on a target hardware device. This compilation requires that a design project (or a significant piece of it) be functionally completed.

Meeting timing requirements is essential to the correct operation of an integrated circuit. For example, for a plurality of D-type flip-flops ("DFFs") to feed through some logic to another plurality of DFFs, it is generally required that the signals form the first set of DFFs must finish propagating through any intermediate logic and have settled to their final state on the D-input of each of the destination DFFs before the next rising edge of the clock. (In fact they must finish before the next clock edge by an amount known as the setup delay of the register $T_{SU}$). If the delay through the resulting logic is greater than the time between rising clock edges, then the state that the destination DFFs will hold on the next clock edge will be undefined.

Quite typically, a designer (or the compiler itself) will modify a design after an initial compilation. This may be required when a timing simulation conducted after compilation indicates a problem. Or, the product requirements may change in the middle of the device's development. Regardless of why a design change is necessary, that change requires a recompile. Unfortunately, each compilation consumes significant time, so multiple recompiles translates to significantly longer development times. This can greatly slow the time to market for an integrated circuit under design. Because PLDs rely on a short time to market as a major selling point, slow development can erase any commercial advantage.

The problem is compounded because maximum CPLD device sizes are increasing at a speed slightly greater than that predicted by Moore's law (i.e., each new chip contains roughly twice as much capacity as its predecessor, and each chip is released within 18–24 months of the previous chip). If compilation time was a linear function of design size then it would be expected that the time to compile the largest device on the most powerful computer would remain approximately constant. Unfortunately, compile times are typically proportional to $n^2$, where n is the number of logic elements on a device. This means that a design twice as big takes four times as long to compile. Consequently, the compile times for the largest devices are accelerating. It is not uncommon for large projects to compile for about 24 hours or more on a modern workstation. Obviously, the fastest compilers will become critical components of integrated circuit design environments.

Large designs often benefit from performing and comparing multiple compilations, each based upon a different compilation parameters or slight design changes. Obviously, given long compile times, most designers do not have the luxury of running multiple compilations for comparison.

An important advance in the effort to reduce compilation time for large devices is incremental compilation. In essence, incremental compilation involves using a previously compiled design such that only a fraction of that design must be recompiled after a user or compiler makes one or more changes to the design. Incremental compilation requires at least two steps: (1) delineating a sphere of influence of user changes in a previously compiled design (the sphere of influence typically being defined within a netlist), and (2) recompiling the logic from within this sphere of influence into appropriate logic elements available within a target hardware device. To maximize efficiency, the compiler should limit recompile to a minimum region of the electronic design (and a corresponding region of a target hardware device) which is directly affected by the design change.

One suitable technique for recompiling the changed logic (step 2) involves resynthesizing the changed logic, remapping the changed logic to logic elements (defined by the target hardware), and then fitting the remapped logic cells at positions on the target hardware device. Preferably, during incremental refitting, unchanged logic cells remain fixed in the same hardware positions that they occupied after the original compilation. If the compiler cannot fit the new design under this constraint, the compiler gradually relaxes the constraints on movement of unchanged logic cells. This technique is described in U.S. patent application Ser. No. 08/958,436 (attorney docket no. ALTRP019/A345), filed on the same day as the instant patent application, naming J. Tse et al. as inventors and entitled "FITTING FOR INCREMENTAL COMPILATION OF ELECTRONIC DESIGNS." That application was previously incorporated herein by reference for all purposes.

At this point, an effective incremental compiler cannot be realized until development of an efficient technique for delineating the portion of an electronic design influenced by a user's design change. Thus, there is a need for an incremental recompile technique that efficiently and correctly identifies logic cells that are effected by a user's design changes.

SUMMARY OF THE INVENTION

The present invention provides a technique and associated compiler for delineating those logic gates in an electronic design that should be resynthesized during an incremental recompile. It accomplishes this by identifying those logic gates within a netlist that are new or are affected by the modification. To understand how this works, recognize that an "original electronic design" has already been fully compiled. Now, a user has made one or more changes to the original electronic design to produce a "changed electronic design." This invention identifies—at the netlist level—where those changes lie and how widely effects of those changes propagate. The gates flagged as changed are then recompiled, while the remainder of the gates from the original design are left as is. The invention operates such that a minimal number of changed gates are identified while capturing all gates necessary to accurately program the user's changed electronic design. The segment of a netlist encompassing this minimal number of changed gates is referred to herein as a "sub-netlist."

In one aspect, the invention may be characterized as a method—typically implemented on a compiler—having the following sequence of operations: (a) receiving an unsynthesized netlist for an original electronic design, a synthesized netlist for the original electronic design, and an unsynthesized netlist for a changed electronic design; (b) identifying one or more new logic nodes in the unsynthesized netlist for the changed electronic design that have been directly changed from the unsynthesized netlist for the original electronic design; (c) in the unsynthesized netlist for the changed electronic design, tracing signal propagation paths between at least one of the new logic nodes and one or more external nodes, such that nodes encountered on the signal propagation path are designated as affected nodes which together with the one or more new logic nodes form the changed portion the unsynthesized netlist for the changed electronic design; (d) synthesizing the changed portion of the unsynthesized netlist for the changed electronic design to produce a synthesized changed portion; (e) incorporating the synthesized changed portion in the synthesized netlist for the original design to produce a synthesized netlist for the changed electronic design; and (f) completing compilation of the synthesized netlist for the changed electronic design.

In this method, the external nodes include "hard registers" and I/O pins which may be identified as follows. The compiler compares the unsynthesized netlist of the changed electronic design with the synthesized netlist of the original electronic design to identify as external nodes those hard registers and I/O pins which are (i) common between the unsynthesized netlist of the changed electronic design and the synthesized netlist of the original electronic design and (ii) output a common signal. From the perspective original synthesized netlist, a hard register is any register except one that (a) implements a different function from the corresponding register in the unsynthesized netlist of the changed design or (b) has been substituted for, or substituted by, another register that implements the same function.

In order to speed compilation, (d) is preferably performed without synthesizing the unchanged portion of the changed electronic design. Also to speed compilation, the compiler may identify one or more new synthesized logic nodes in the synthesized netlist for the changed electronic design that have been directly changed from the synthesized netlist for the original electronic design. Then, when compilation is completed (stage f), it is limited to a portion of the synthesized netlist for the changed electronic design, which portion is delineated by the new synthesized logic nodes.

The process of tracing signal propagation paths (stage c), preferably includes one or both of (i) tracing a path forward from an output of a new logic node to one or more external nodes, and (ii) tracing a path backward from an input of a new logic node to one or more external nodes.

Further details and advantages of the invention are provided in the following Detailed Description and the associated figures.

DETAILED DESCRIPTION OF THE PREFERRED EMBODIMENTS

1. Definitions

Figure 1:
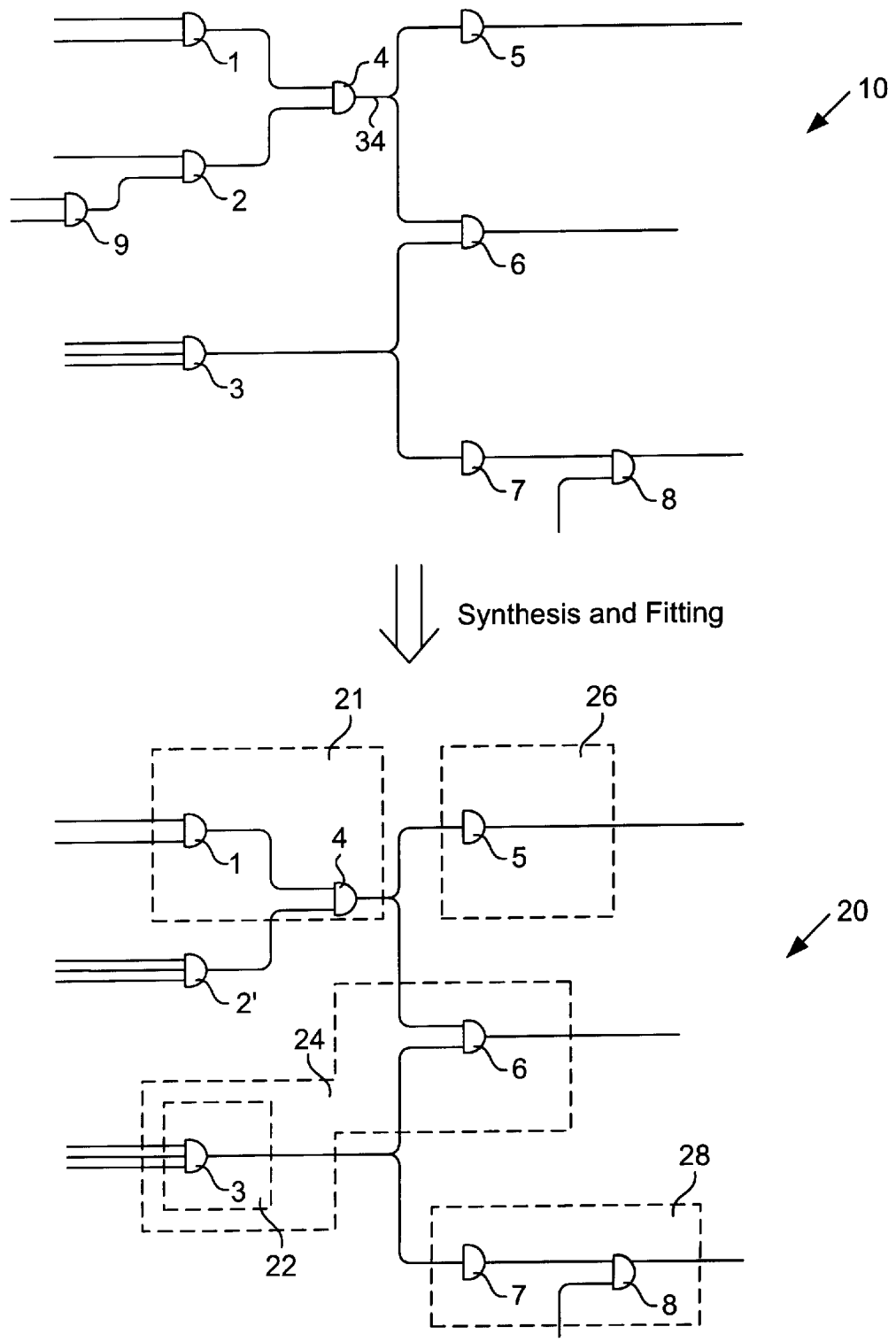
FIG. 1 is an idealized representation illustrating how a pre-synthesis netlist may be synthesized and mapped onto hardware logic elements.

Some of terms used herein are not commonly used in the art. Other terms have multiple meanings in the art.

Therefore, the following definitions are provided as an aid to understanding the description that follows. The invention as set forth in the claims should not necessarily be limited by these definitions.

The term "compiler" is used throughout this specification to refer to software—and apparatus for running such software—that compiles an electronic design. Its functions may include synthesizing a netlist, fitting a synthesized netlist on a target hardware device, simulating an electronic design, etc. In the context of this invention, a compiler will also identify a "changed" portion (specifically, a sub-netlist) of an electronic design that should be recompiled during incremental recompile.

The term "electronic design" refers to the logical structure of an electronic device such as an integrated circuit. It may be implemented on hardware (usually referred to herein generically as a "target hardware device"). During the design and development effort, an electronic design (often a digital circuit design) may exist in various states or stages. It may be provided as a high level Boolean representation (encoded in a hardware design language for example), as a schematic or circuit representation, or any other form representing the logical arrangement of a device. It may include other facets such as floor-plan constraints, wave-form constraints, timing constraints, fitting constraints, etc. At the gate level, it may exist as a netlist (whether synthesized or not) prior to placement on a target hardware device. It may even include completed place and route assignments.

When in the form of a synthesized netlist, an electronic design may be divided into "logic cells" representing various logic functions within the electronic design. These logic cells are mapped onto "logic elements" of the target hardware device during compilation. The criteria for mapping gates into logic cells is that a resulting logic cell must be able to be put into one logic element. An example of a logic cell is a collections of gates (connected in some way and implemented in a look-up table) combined with a register and configured to implement a multiplexer.

The terms "new gate" and "directly modified gate" are used interchangeably herein. A gate is "new" if, after a previous compilation, the user or the design software has added it to the design or directly changed its functioning in the design. Often, such new gates are identified by comparing the unsynthesized netlists of original and changed designs. New gates may fall into one of the following categories: (a) a newly added gates (i.e., gates that did not exist in the netlist employed in the previous compile) or (b) gates whose functions have changed (e.g., a three input AND gate became a three input NAND gate) or (c) gates whose inputs have changed (i.e., the signals provided to the gate are not identical to those in netlist for the previous compile).

Preferably, the design software does not use the same name for two related gates if their function differs or for two lines if their signals differ. Thus, newly added gate (case (a)) or a gate with a new function (case (b)) may be readily identified because no gate in the netlist from the previous compile has the same name. A gate whose inputs have changed (case (c)) may have a different number of inputs or a different signal provided on a given input. A gate having a different input signal is identified by a name that changed from the previous compile.

The terms "changed gate" and "modified gate" are used interchangeably throughout this document in reference to logic gate that are influenced by a user's change to an electronic design after that design was previously compiled. This definition is broad enough to encompass all "new" gates as well as other gates affected by the new gates. As used herein, changed gates that do not qualify as new gates are referred to as "affected gates" or "indirectly modified gates." That is, a changed gate is either a new gate or an affected gate. In one specific embodiment of this invention, affected gates are identified by residing a path connecting a new gate to an "external gate" (certain registers and output pins as described below). Procedures for identifying affected gates will be detailed below.

Collectively, the changed logic gates of an electronic design define a "changed portion" of that electronic design. Collectively, the unchanged logic gates of an electronic design define an "unchanged portion" of the electronic design. The portion of a netlist encompassing all changed gates in an electronic design. (i.e., the changed portion) will sometimes be referred to as a "sub-netlist." In the context of this invention, a compiler may resynthesize and remap the entire "sub-netlist" during incremental recompile without synthesizing or mapping the remaining portion of the original netlist.

The term "target hardware device" refers to a hardware device on which an electronic design is implemented. Examples include circuit boards and systems including multiple electronic devices and multi-chip modules, as well as integrated circuits. Specific examples of integrated circuits include traditional integrated circuits with full custom layouts, hardwired ASICs (e.g., gate arrays) designed with high level design tools, and programmable ASICs such as FPGAs and PLDs. In the case of non-programmable integrated circuits such as gate arrays, the electronic design defines the arrangement of metal lines on one or more metallization layers of the target hardware device. In the case of programmable integrated circuits such as PLDs, the electronic design defines the gate functions as well as interconnects to be programmed on the target hardware device.

In the context of this invention, a target hardware device typically includes a plurality of "logic elements" which house logic cells from an electronic design in order to implement the logic functions specified by these cells. The logic elements are typically a fundamental element of the hardware device's architecture on which different logic gates can be defined. These elements may be grouped into blocks such that each logic element is associated with a block (or other arbitrary containment entity). There may be higher level organization in the device such that logic blocks are grouped into half-rows or some other arbitrary entity.

In the case of a FLEX10K CPLD (available from Altera Corporation of San Jose, Calif.), for example, logic elements are provided at the bottom level of a containment hierarchy. In this architecture, multiple logic elements are grouped into logic array blocks (LABs), which are in turn organized into half-rows, which are in turn organized into rows. By way of contrast, in the case of the XC4000 (available from Xilinx Corporation of San Jose, Calif.) logic elements are provided in a flat grid without a hierarchical structure.

The term "fitting" is used throughout this specification to describe a process whereby a compiler fits an electronic design onto a target hardware device. The term "fit" may be used interchangeably with "place and route." As this synonym suggests, fitting can be divided into two phases: a placement phase and a routing phase. At the placement phase, the compiler positions logic cells of the electronic design with respect to logic elements of the target hardware device. During the routing phase, the compiler chooses interconnects between logic elements to "wire" the logic cells placed on the device.

2. Context of the Invention

While most examples presented herein depict PLD design compilation, the methodologies of this invention find application in any electronic design compilation in which a netlist or similar logical representation is employed. In the case of a traditional integrated circuit design created using high level design tools, for example, compilation involves the following steps: (a) synthesis from a hardware design language (e.g., VHDL or Verilog), (b) automatic place and route, and (c) simulations. The present invention may be employed to expedite step (a).

This invention may be integrated in a conventional PLD design effort as follows. Initially, a full compile of an "original" design is performed. This full compile may be performed using traditional PLD compilation procedures. The procedure takes as an input an unsynthesized netlist representing a schematic of the user's design and outputs instructions for programming a PLD target hardware device.

This netlist is used to described the functionality of a digital circuit design that can be implemented on a programmable logic device or other target hardware device. The netlist is represented as a hierarchical collection of gates, state machines, high level constructs such as counters or adders, or any other means of defining a collection of outputs based on a collection of inputs. The nodes of the netlist (gates, state machines, etc.) are connected together via nets. Each of these nets is associated with a named digital signal. A logic synthesizer module of a compiler takes this netlist and simplifies its gate representation in a process referred to as synthesis.

The process of simplifying a gate representation consists of performing Boolean manipulations on the netlist: removing redundant gates or replacing the gates of a sub-network of the design with an equivalent network of newly generated "synthesized gates." These synthesized gates do not necessarily have a one-to-one correspondence to any single gate in the original netlist.

Synthesis can be a computationally expensive procedure. The present invention reduces this expense by limiting the region of a netlist to be synthesized during incremental recompile.

FIG. 1 presents a hypothetical generic netlist in two phases: an unsynthesized phase and a synthesized (and mapped) phase. An unsynthesized netlist 10 includes a collection of generic gates or nodes connected by nets. A synthesized netlist 20 is obtained by synthesizing netlist 10. The gates of synthesized netlist 20 are mapped into various logic cells (which will ultimately be placed in logic elements of a target hardware device) including logic cells 21, 22, 24, 26, and 28 delineated by dotted boundary lines.

In this hypothetical example, during synthesis, a two-input logic gate 2 and another two-input logic gate 9 are combined to form a three-input logic gate 2'. Otherwise, all gates and the connections therebetween are maintained in the pre- and post-synthesis netlists 10 and 20. These unchanged generic gates include a gate 1, a gate 3, a gate 4, a gate 5, a gate 6, a gate 7, and a gate 8.

In the synthesized netlist 20, logic gates 1 and 4 are mapped to logic cell 21 of the target hardware device. Logic gate 3 is mapped, by itself, to logic cell 22. Logic gate 3 and logic gate 6 together are implemented in logic cell 24. Logic gate 5 is implemented, by itself, in logic cell 26. Finally, logic gates 7 and 8 are implemented in logic cell 28. Note that the function of logic gate 3 is implemented in two separate logic cells.

After the full compilation is concluded, the user may decide to make a change to the overall design which was previously subject to the full compilation. To reduce the time required to compile the user's changed design, incremental compilation may be applied.

A primary goal of the procedures of this invention is to flag the fewest possible gates as changed (modified) gates for incremental recompilation. Thus, the changed electronic design can be synthesized and mapped and then fit to the hardware with a minimal disruption in the existing compiled design. However, it must be ensured that the newly defined electronic design accurately implements the user's changes.

Figure 2:
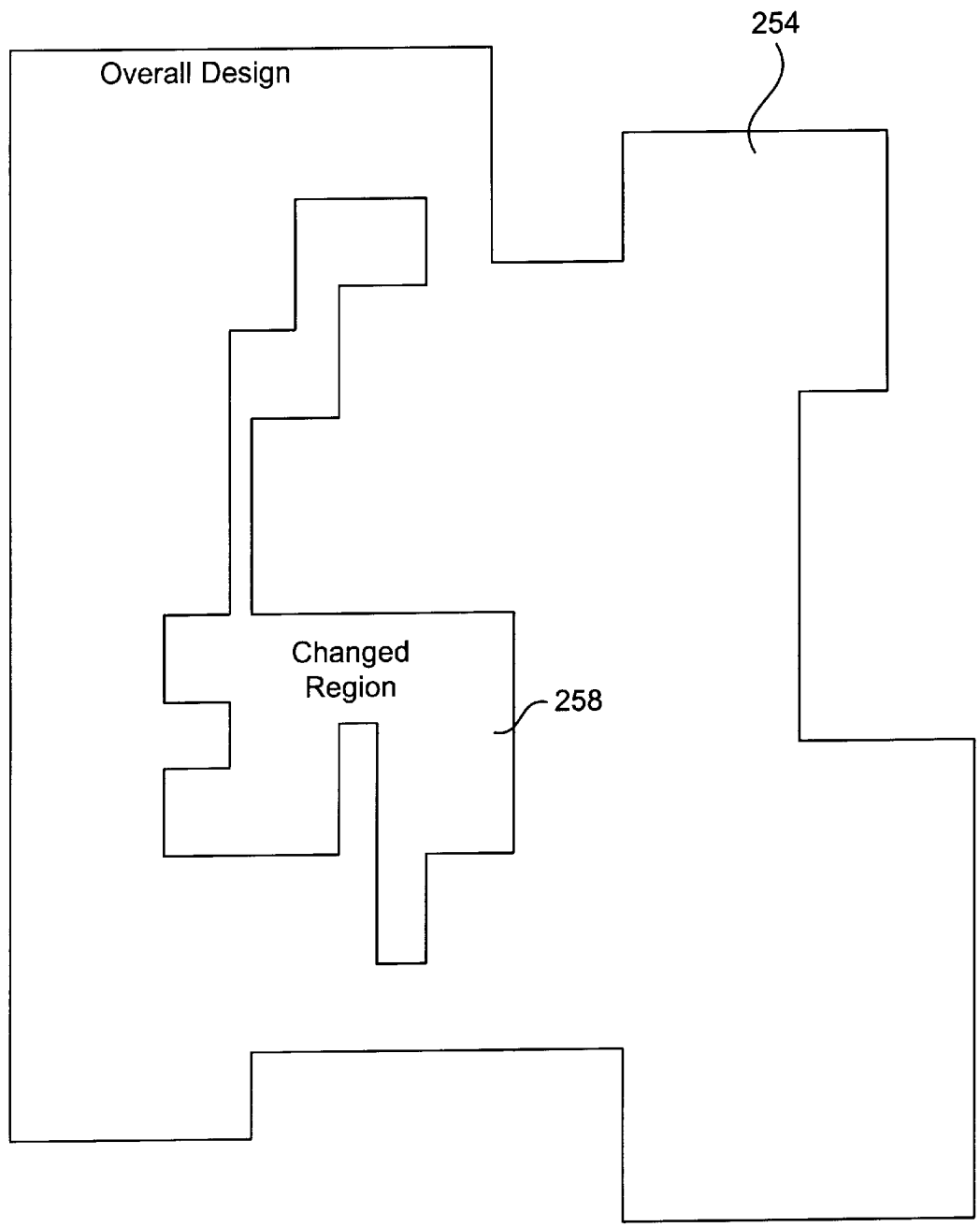
FIG. 2 is an idealized representation of an electronic design showing the boundaries of a changed portion of that design surrounded by a larger unchanged portion.

FIG. 2 presents a generic representation of an electronic design. An "overall design" 254 represents a complete electronic design for a given device or a substantially independent portion of that design. It may or may not subsume an entire target hardware device. Within overall design 254, there is a "changed portion" 258 representing the portion of overall design 254 affected by a user's changes (or independently the design software's changes) after full compilation. While FIG. 2 shows only a single changed region 258, it should be understood that overall design 254 may contain multiple changed portions.

It should also be understood that the changes actually made at the hands of the user may have been limited to a few "new" gates representing a subsection of changed portion 258. However, those changes typically have a wider sphere of influence—directly affecting a more encompassing region delineated by the boundaries of changed portion 258. It is the function of the methods of this invention to identify the boundaries of changed region 258.

FIG. 2 provides a conceptual tool. It may generally describe the state of affairs at various stages in the compilation procedure (e.g., post-synthesis or even post fitting). For purpose of this invention, however, it is most usefully considered to be a pre-synthesis netlist. Regardless of this, changed region 258 should be made as small as possible to reduce the compiler's work on incremental recompile. This allows recompilation to be performed much faster than if the entire design 254 had to be compiled after each design change.

Figure 3A:
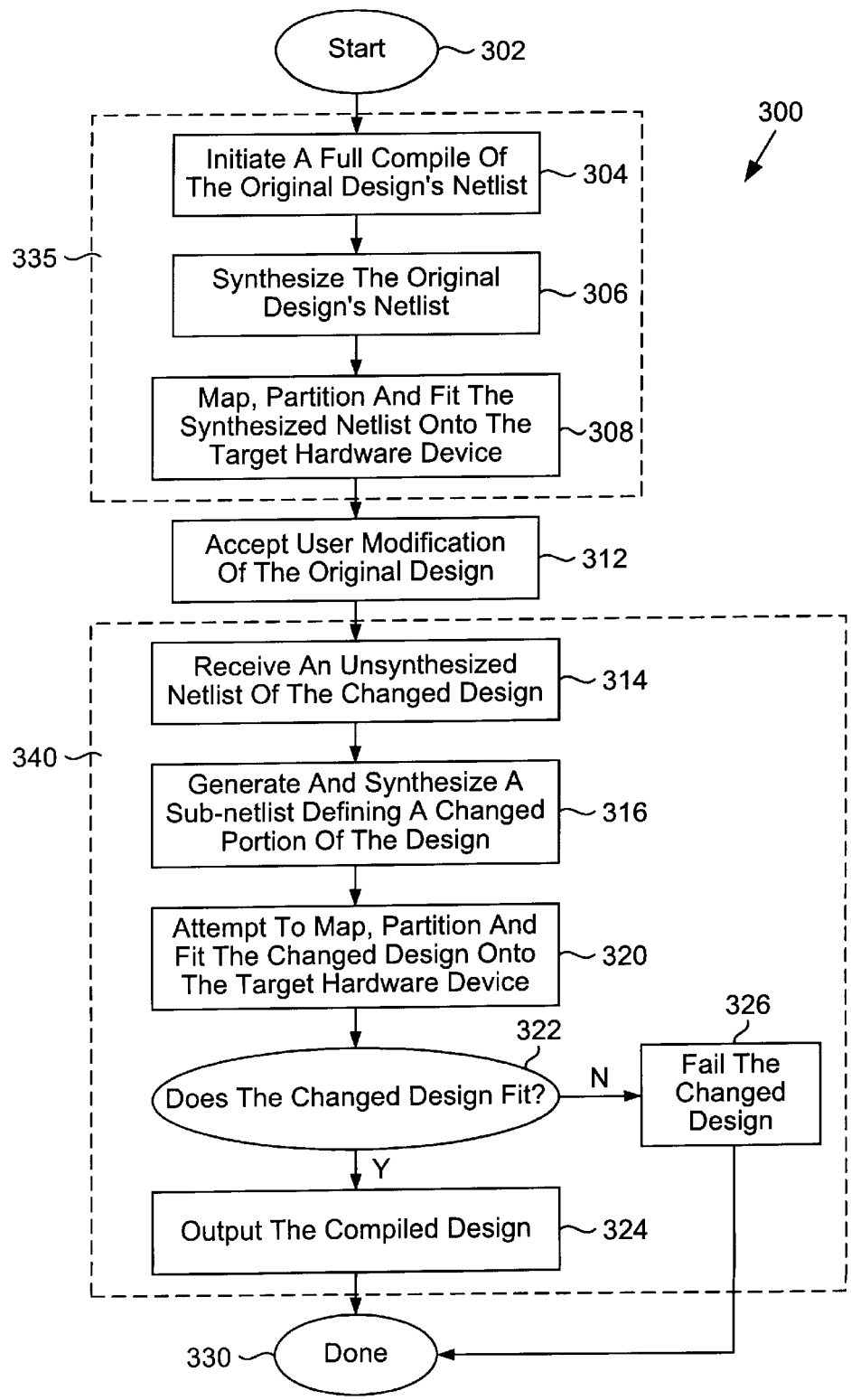
FIG. 3A is a process flow diagram depicting how the incremental recompile methodologies of this invention may be incorporated into a standard compilation/recompilation design flow.
Figure 3B:
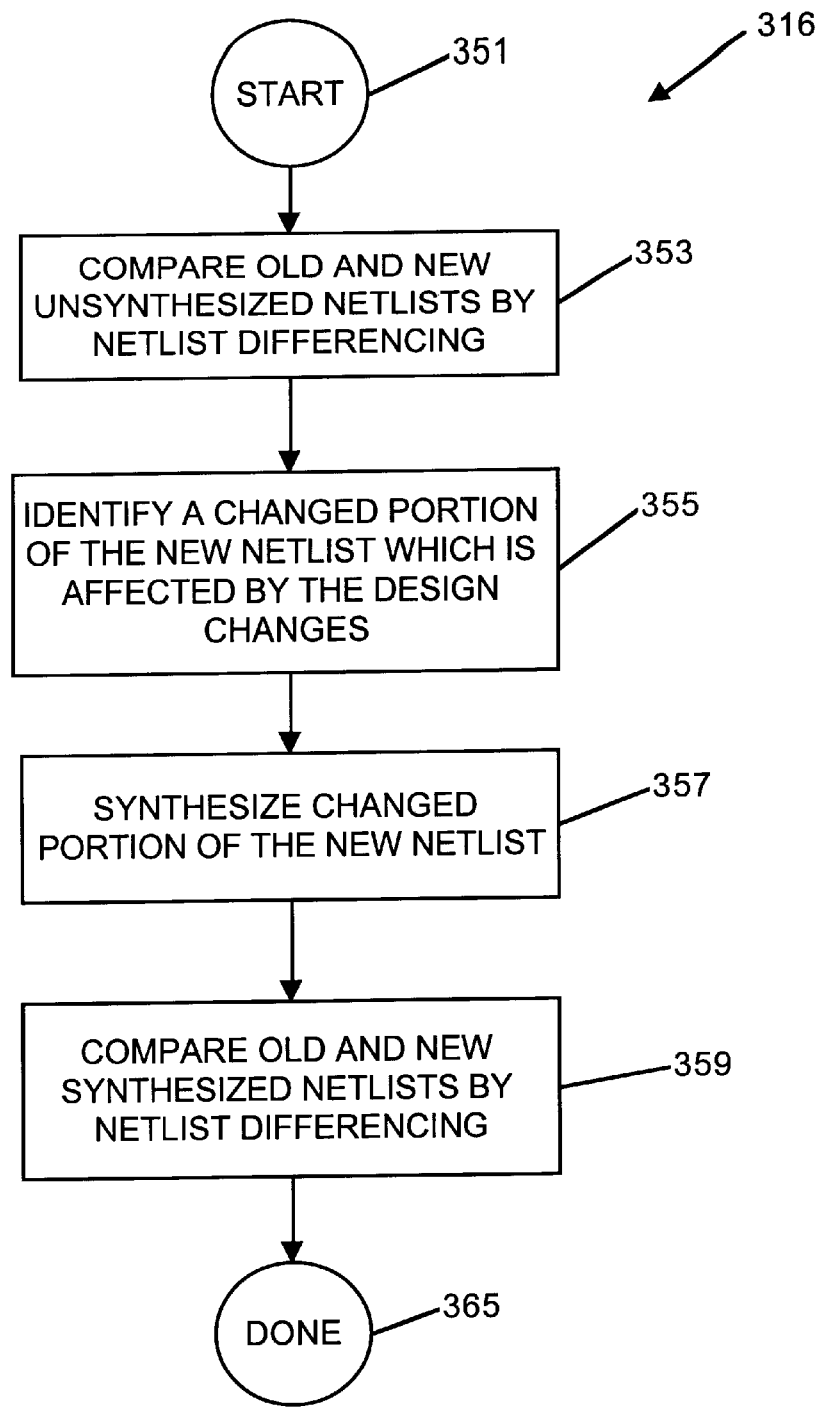
FIG. 3B is a process flow diagram illustrating incremental compilation in accordance with one embodiment of this invention.

One example of how incremental compilation may be integrated in a larger electronic design automation process is detailed in the process flow diagram depicted in FIGS. 3A and 3B. As mentioned a sub-netlist represents the changed portion of an electronic design, and, as such, it must be synthesized during an incremental recompile. The remainder of the unsynthesized netlist (the unchanged portion) from the original design is left as is during the recompile. It should be understood that the described process flow diagram represents but one method for performing incremental recompilation in accordance with the invention.

The steps of the process depicted in FIG. 3A can be roughly divided into two stages: (a) an initial compilation stage 335 and (b) an incremental recompilation stage 340. As shown, a process 300 begins at 302 and then in a step 304 the compiler initiates a full compile of the original unchanged electronic design's netlist. This may simply involve receipt of a user's compilation command. After compilation is initiated, the compiler synthesizes the original design's netlist at a step 306. Then, the gates from the synthesized netlist are mapped, partitioned, and fit into logic cells at a step 308.

During mapping, a technology mapper module of a compiler maps the gates of the synthesized netlist into logic cells. For each cell, the technology mapper may map one or more gates into a logic cell. As mentioned, each logic cell must be able to be put into one logic element which, as noted, corresponds a basic physical element of the target hardware device (e.g., a PLD). After technology mapping, the various cells of the electronic design may have to be partitioned between various hardware entities. In some cases, the hardware entities are multiple chips. This is the case when the design is too big to fit on a single chip. Also, the design may be partitioned between entities on a single chip such as rows or quadrants defined according to the architecture of the target hardware device. The purpose of partitioning is to minimize the number signals crossing boundaries between hardware entities.

To complete full compilation, a place and route module of the compiler fits the logic cells. First, the place and route module places the logic cells into the logic elements within the appropriate partition of the programmable logic device. These logic elements have inputs and outputs which are connected together via wires (sometimes referred to as "interconnects") during the routing stage of place and route. Placement methods are described in U.S. Pat. No. 5,341,308, issued on Aug. 23, 1994, naming D. W. Mendel as inventor, and entitled "METHODS FOR ALLOCATING CIRCUIT ELEMENTS BETWEEN CIRCUIT GROUPS." That application is incorporated herein by reference for all purposes. One suitable routing algorithm is described in R. R. Suaris and G. Kedem, "A quadrisection-based combined place and route scheme for standard cells" IEEE Transactions on CAD of Integrated Circuits and Systems, CAD-8 (3):234–244, 1989. That reference is incorporated herein by reference for all purposes.

After step 308, the initial compilation is complete and the designer/user may be satisfied with the results. However, the techniques of this invention are applicable to an incremental recompile so it will be assumed that the user (or design software) is not completely satisfied with the compiled design and makes a change. Thus, at a step 312, the system accepts a modification of the original design. For example, the user may input his or her modifications at a relatively high level in the design process; by HDL instructions for example. However, the changes are ultimately reflected as direct modifications to one or more of the gates and/or nets of the original unsynthesized netlist. As explained below, the direct changes to the new netlist may be identified by comparison with the original netlist, for example. Alternatively, a high level design tool allowing the user to input the changed design may automatically flag new gates and may actually perform step 312.

After the user's changes have been accepted into the design and the new gates have been identified, the second stage (incremental recompile stage 340) of process 300 begins. The compiler now receives an unsynthesized netlist of the changed design at a step 314. It then generates and synthesizes a sub-netlist defining a "changed" portion of the electronic design that has been affected by the user's changes. See step 316. This process step will be detailed below with reference to FIG. 3B. Remember that the sub-netlist include both "new" gates that have been directly modified by the user's changes as well as "affected gates" (indirectly modified gates) that have been influenced by the user's changes. Thereafter, the compiler maps the changed design into logic cells and attempts to partition and fit the changed design into the target hardware device at a step 320.

It is possible that the changed design cannot be fit on the target hardware device. Therefore, the compiler must determine at a decision step 322 whether or not the changed design actually fits onto the target hardware device. If the answer is yes, the compiler outputs the compiled design at a step 324 and the process is completed at 330. If, on the other hand, the compiler concludes that the changed design does not fit on the target hardware device, it notifies the user of a failed attempt at a step 326. The process is therefore completed at 330.

One approach to generating and synthesizing a sub-netlist (step 316) is illustrated as a process flow diagram in FIG. 3B. As shown, a generation and synthesis process 316 starts at 351 and in a process step 353 a compiler compares the unsynthesized netlists of the original and changed designs by a process known as netlist differencing. Netlist differencing identifies all nodes of a netlist that have been directly changed in the original unsynthesized netlist. For example, some gates may be removed, other gates may be added, the function of a gate may be changed, the inputs to a gate of the same function may be changed, etc. As noted above, nodes so identified are referred to as "new" nodes or "directly modified" nodes.

One suitable approach to netlist differencing is described in is described in U.S. patent application Ser. No. 08/619,073 (attorney docket no. A235), filed on Mar. 20, 1996, naming Lee as inventor and entitled "METHODS FOR IMPLEMENTING CIRCUIT DESIGNS IN PHYSICAL CIRCUITS." That document is incorporated herein by reference for all purposes. Briefly, netlist differencing involves matching components (e.g., gates) of two netlists having the same user-assigned names. Those components having the same names and features are verified as matching. The unmatched components are further compared by considering the basic features that they have in common and the basic features of their neighboring components. After the component matching procedures have been completed, inter-component connections (nets) are considered. For each matched component, if a matched immediate neighbor of that component is not matched to one of the immediate neighbors of that component's match in the other netlist, then the connection between the component and the matched immediate neighbor is marked changed.

After netlist differencing at step 353, the compiler next identifies a changed portion of the unsynthesized netlist at a step 355. This changed portion is the "sub-netlist" described above. The sub-netlist contains the logic nodes that are affected by the design changes identified at step 353 (both directly and indirectly modified nodes). The compiler performs step 355 via a method which is the subject of this invention. Next, the compiler synthesizes the changed portion of the changed design at a step 357. To save resources, it typically does not synthesize the unchanged portion of the design.

Now the newly synthesized sub-netlist may replace a corresponding portion of the original synthesized netlist. The original and changed synthesized netlists may optionally be compared against one another by netlist differencing. See step 359. This optional step confirms which nodes of the synthesized netlist have actually changed. Only those gates need be considered in subsequent incremental compilation procedures. The process is now complete at 365 and process control is directed to step 320 of process 300 (FIG. 3A). That is, the compiler now maps, partitions, and fits the changed gates of the synthesized netlist into logic cells while preserving as much of the original fitting as possible.

3. Delineating a Sub-Netlist by Identifying Modified Logic Nodes

Figure 4A:
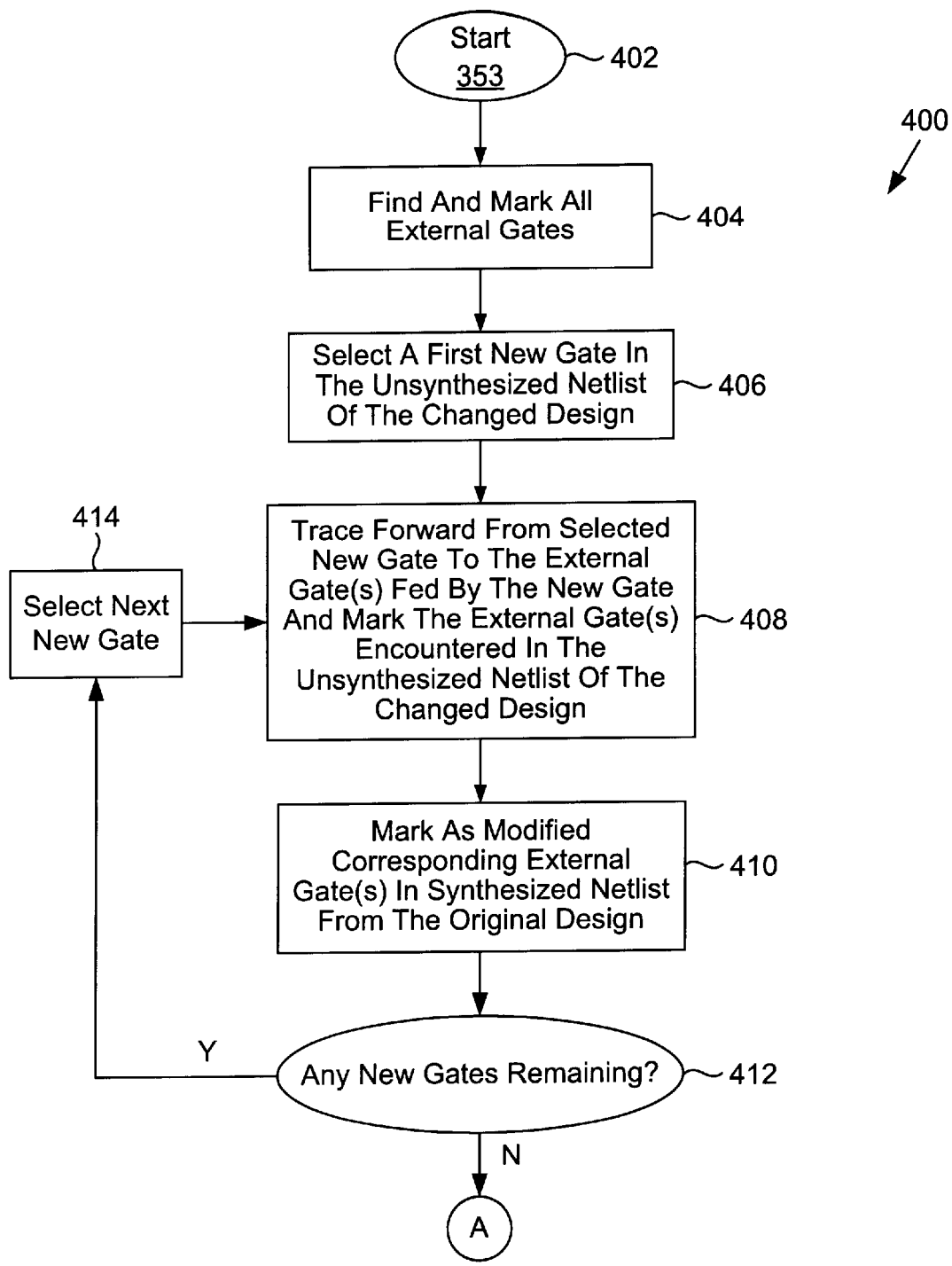
FIGS. 4A and 4B are together a process flow diagram illustrating some of the significant steps in a procedure for generating a sub-netlist in accordance with one embodiment of the present invention.
Figure 4B:
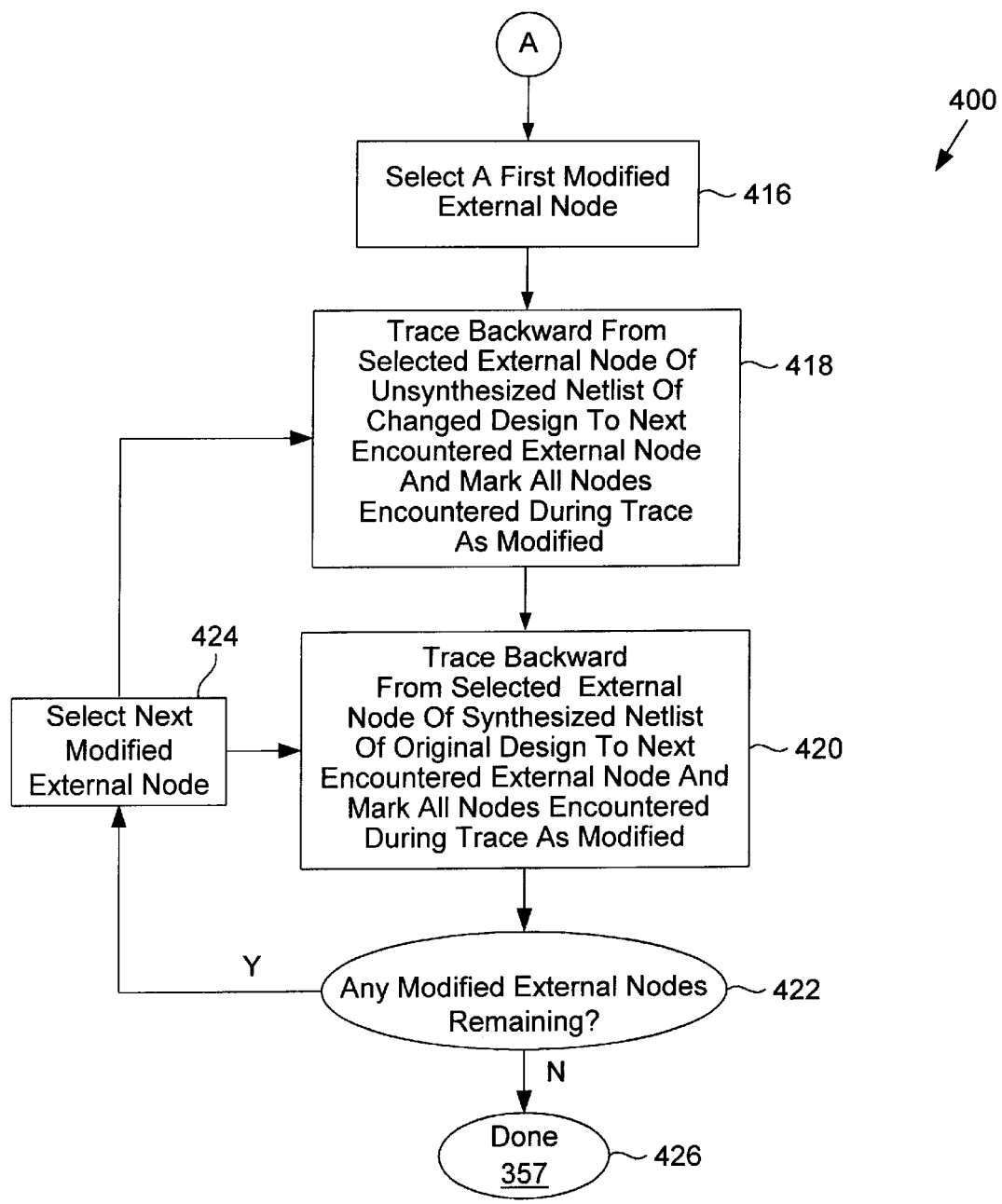

One process of identifying a sub-netlist (step 355 of FIG. 3B) is detailed in the flow chart presented in FIGS. 4A and 4B. The compiler conducts the process in both the unsynthesized netlist of the changed design and the synthesized netlist of the original design. This allows the sub-netlist (from the unsynthesized netlist of the changed design) to be synthesized independently and then directly replace the corresponding portion of the synthesized netlist for the original design.

As inputs, the process requires the synthesized netlist of the original design as well as the unsynthesized netlist of the changed design. It also requires a list of new (directly modified) nodes obtained by comparing the unsynthesized netlists of the changed and original designs. This may be obtained by the netlist differencing step 353 of FIG. 3B as discussed above. It also forms the first part of the sub-netlist.

In overview, process 355 involves first identifying "external nodes" which are input/output pins and certain registers (defined below) common to both the synthesized original design and the unsynthesized changed design. Then, the compiler recurses forward from the new nodes to external nodes and, thereafter, recurses backward from those external nodes to the next external nodes in the path. The nodes encountered during the backward recursion from the external nodes are included in the sub-netlist.

A process 400 for generating a sub-netlist is presented in FIGS. 4A and 4B. The process begins at 402 and then, in step 404, it finds and marks all external gates in the synthesized original design and unsynthesized changed design. This process will be described in more detail below with reference to FIG. 6.

Next, at a step 406, a compiler selects from among the list of new gates (identified at step 353 of process 316), a first new gate for consideration. This first new gate is, of course, provided in the unsynthesized netlist of the changed design. From this new gate, the compiler traces forward from its output through the unsynthesized netlist by recursion to the next external gate or gates that it encounters. It marks these external gates as "modified." This is accomplished at a step 408 in process 400. The compiler also marks as modified the corresponding external gate or gates in the synthesized netlist from the original design at a step 410.

It is worth noting that the modified external nodes of the unsynthesized changed netlist form part of the sub-netlist. Therefore, the compiler may add them to the sub-netlist at step 408. The compiler may also generate a corresponding list of gates to be replaced from the synthesized netlist of the original design. The modified external gates identified at step 410 may be added to this list.

After the modified external gate or gates have been identified by forward recursion from the current new gate under consideration, the compiler must determine whether there are any new gates remaining to be considered. See decision step 412. In one embodiment, all new nodes are listed in the sub-netlist which can be consulted to determine whether any new nodes remain. Assuming that decision step 412 is answered in the affirmative (there are new nodes remaining), the compiler then selects the next new gate for consideration at a process step 414. Process control is then directed to step 408 where the compiler traces forward from the selected new gate to identify any additional modified external gates. The process then continues through steps 408, 410, and 412 as described above. It should be understood that on each loop through steps 408 and 410, the compiler marks only those external nodes that were not previously marked as modified.

After all the new nodes have been exhausted, decision step 412 will be answered in the negative and the next stage of the process will begin. Initially, the compiler selects a first modified external mode for consideration at a step 416. This could be, in one embodiment, the first listed modified external node in the sub-netlist.

From the first modified external node, the compiler recurses backwards through the unsynthesized netlist for the changed design until it encounters other nodes marked as external. During this recursion, the compiler marks all nodes that are encounters as "modified." These modified nodes also form part of the sub-list and may now be added to the list of nodes in the sub-netlist. The compiler performs these operations at a step 418 in process 400. The compiler performs a similar operation on the synthesized netlist of the original design at a process step 420. Specifically, a compiler recurses backwards from the selected modified external node of the synthesized netlist until it encounters other external nodes. During recursion, it marks nodes that it encounters as modified and add them to a list of nodes to be replaced.

After gate step 420 is completed, the compiler must determine whether there are any modified external nodes remaining for consideration. It does this at a decision step 422. If there are additional modified external nodes that are to be considered, the compiler selects the next modified external node at a process step 424 and directs process control back to step 418. From there, the compiler performs a backward recursion as described above. The compiler continues to loop through steps 418, 420, 422 and 424 until all modified external nodes have been considered. At that point, decision step 422 is answered in the negative and the process is completed at 426. It should be understood that on each loop through steps 420 and 422, the compiler marks only those nodes that were not previously marked as modified.

Figure 5:
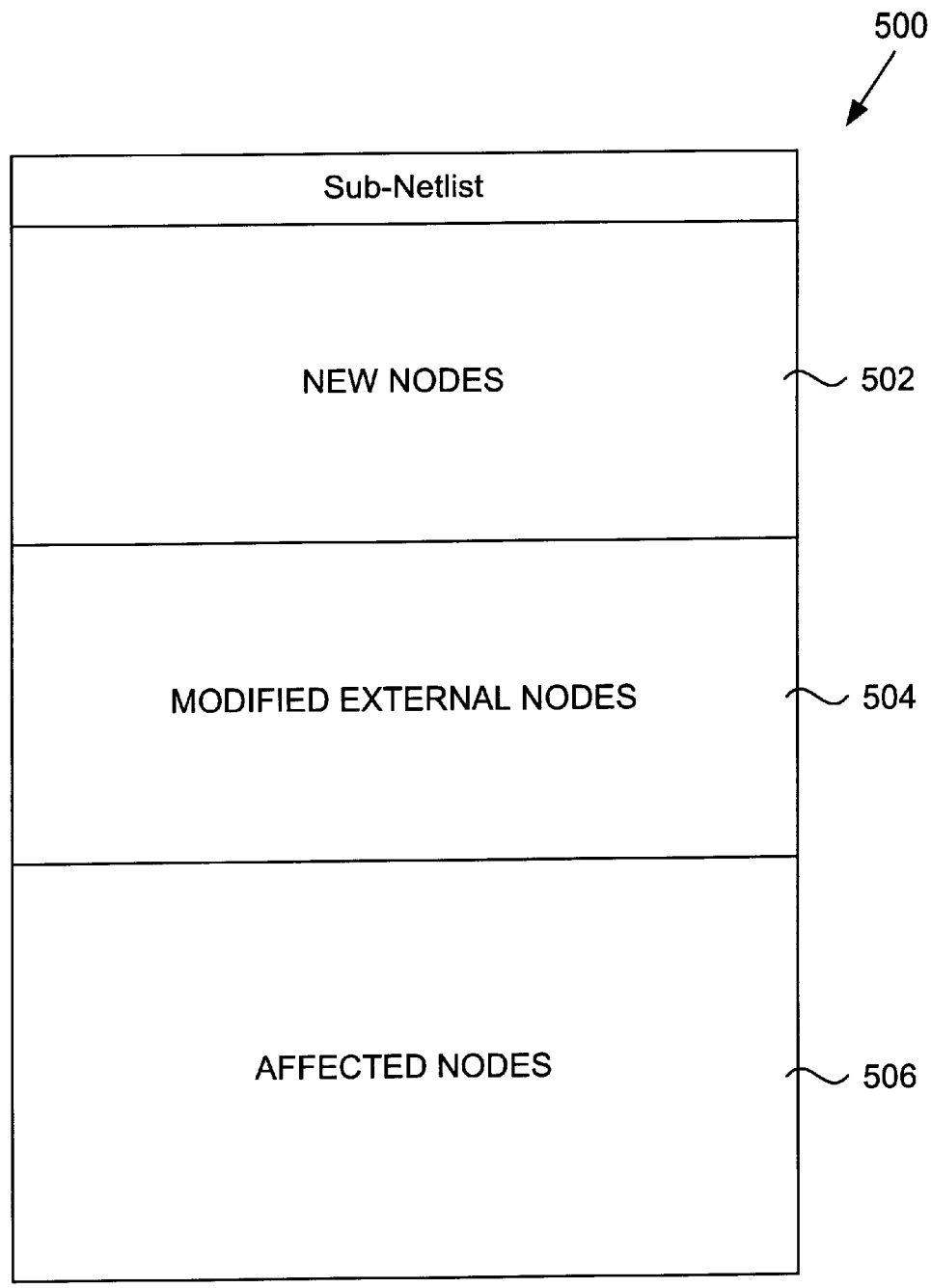
FIG. 5 is a block representation of a sub-netlist and its components in accordance with one embodiment of this invention.

Turning now to FIG. 5, a block representation of a sub-netlist 500 of this invention is depicted. As shown, sub-netlist 500 includes three main components. First, it includes a list of new nodes 502 (directly modified by the user or design software). These may have been identified by netlist differencing at step 353 of process 316. Second, sub-netlist 500 includes a list of external modified nodes 504. These were identified at step 408 of process 400. Finally, sub-netlist 500 includes a list of affected nodes 506 that were identified during the backward recursion described with reference to step 418 of process 400.

As mentioned, a portion of the synthesized netlist for the original design is replaced with the synthesized sub-netlist. In order to know what part of the synthesized netlist from the original design must be replaced, the compiler can consider portions 504 and 506 of sub-netlist 500. Or, it may prepare a separate list of nodes for replacement associated with the synthesized netlist for the original design.

To effect the replacement, the unmodified external nodes of the changed design's unsynthesized netlist can be treated as input ports feeding the resynthesis region, and the modified external nodes can be treated as outputs for the resynthesis region. Once the sub-netlist has been resynthesized, the resulting network of logic elements can be substituted back into the original design's synthesized netlist—connecting I/O ports of the sub-network to external wires of the original synthesized netlist.

Figure 6:
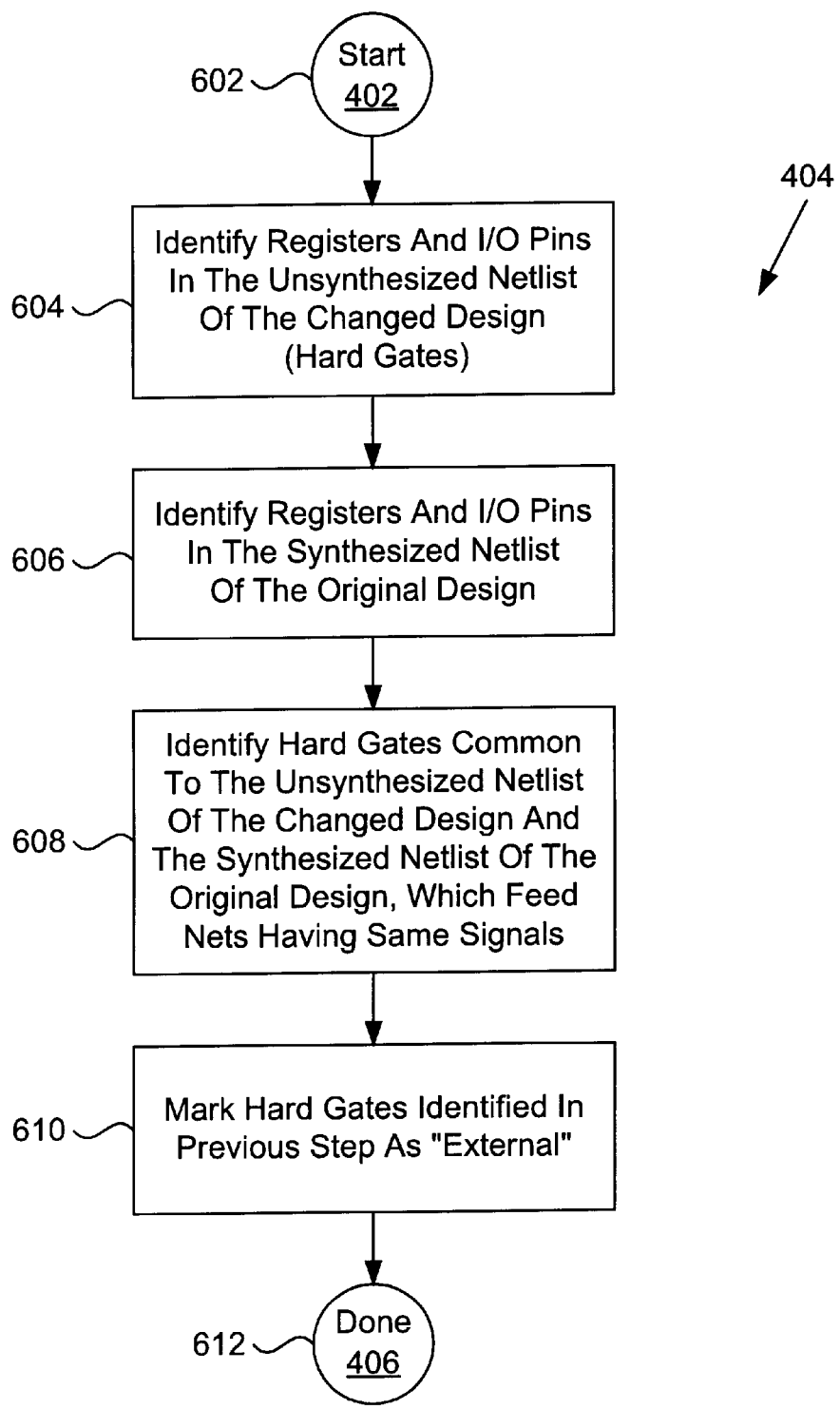
FIG. 6 is a process flow diagram illustrating some of the significant steps in a procedure for identifying external nodes for use in the process of FIGS. 4A and 4B.

FIG. 6 depicts one process for identifying external nodes. As shown, the process 404 begins at 602 and then in a process step 604, the compiler identifies all input/output pins and certain registers in the unsynthesized netlist for the changed design. The identified registers are all registers except those that implement a function different from the corresponding register in the original unsynthesized design and those that have been substituted for, or have been substituted by, another register implementing the same function. These registers and input/output pins are sometimes referred to as "hard gates." Next, at a process step 606, the compiler identifies all hard gates in the synthesized netlist for the original design.

At this point, a compiler identifies those hard gates needing two criteria in the unsynthesized changed netlist and the synthesized original netlist. Specifically, a compiler identifies hard gates that posses the two following features: (i) they are common to both the unsynthesized netlist of the changed design and a synthesized netlist of the original design, and (ii) they feed nets having the same signal. The step of identifying such hard gates is represented by step 608 in process 404. At this point, the compiler marks those hard gates meeting the criteria of step 608 as "external gates" at a step 610. The process is concluded at 612.

FIGS. 7A–7D follow the progress of an unsynthesized network for an original design through a synthesized network for a changed design. Along the way, a subnetlist is identified and resynthesized in accordance with this invention.

Figure 7A:
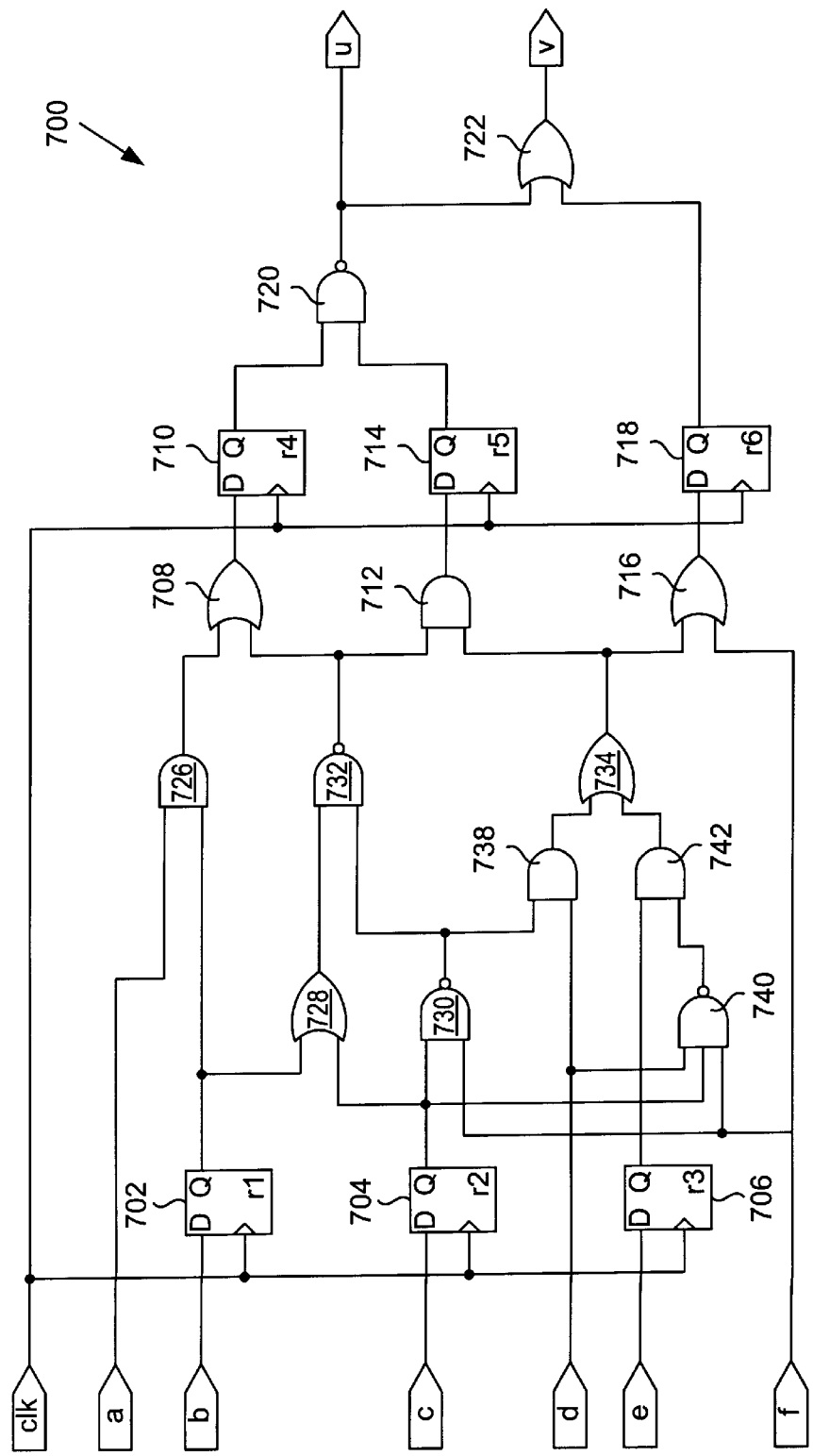
FIGS. 7A, 7B, 7C, and 7D are gate-level representations illustrating, in sequence, full compilation of an original design followed by incremental recompilation of a changed design, and showing the generation of a sub-netlist representing the changed portion of the design.

In FIG. 7A, an unsynthesized netlist 700 of an original design is depicted. It includes various inputs (input pins "a" through "f") together with a clock input (clk). The clock signal feeds various registers in netlist 700 including a register 702, a register 704, and a register 706. Also, register 702 is fed by input "b," register 704 is fed by input "c," and register 706 is fed by input "e."

A network of gates is fed by the described inputs and registers. Within this network, an OR gate 708 feeds a register 710 as shown. In addition, an AND gate 712 feeds a register 714 and another OR gate 716 feeds a register 718 as illustrated. The outputs of registers 710 and 714 feed a NAND gate 720 which, in turn, feeds an output pin "u." The output of NAND gate 720 also feeds an OR gate 722 as shown. OR gate 722 is also fed by the output of register 718. OR gate 722 outputs a signal to an output pin "v."

Figure 7B:
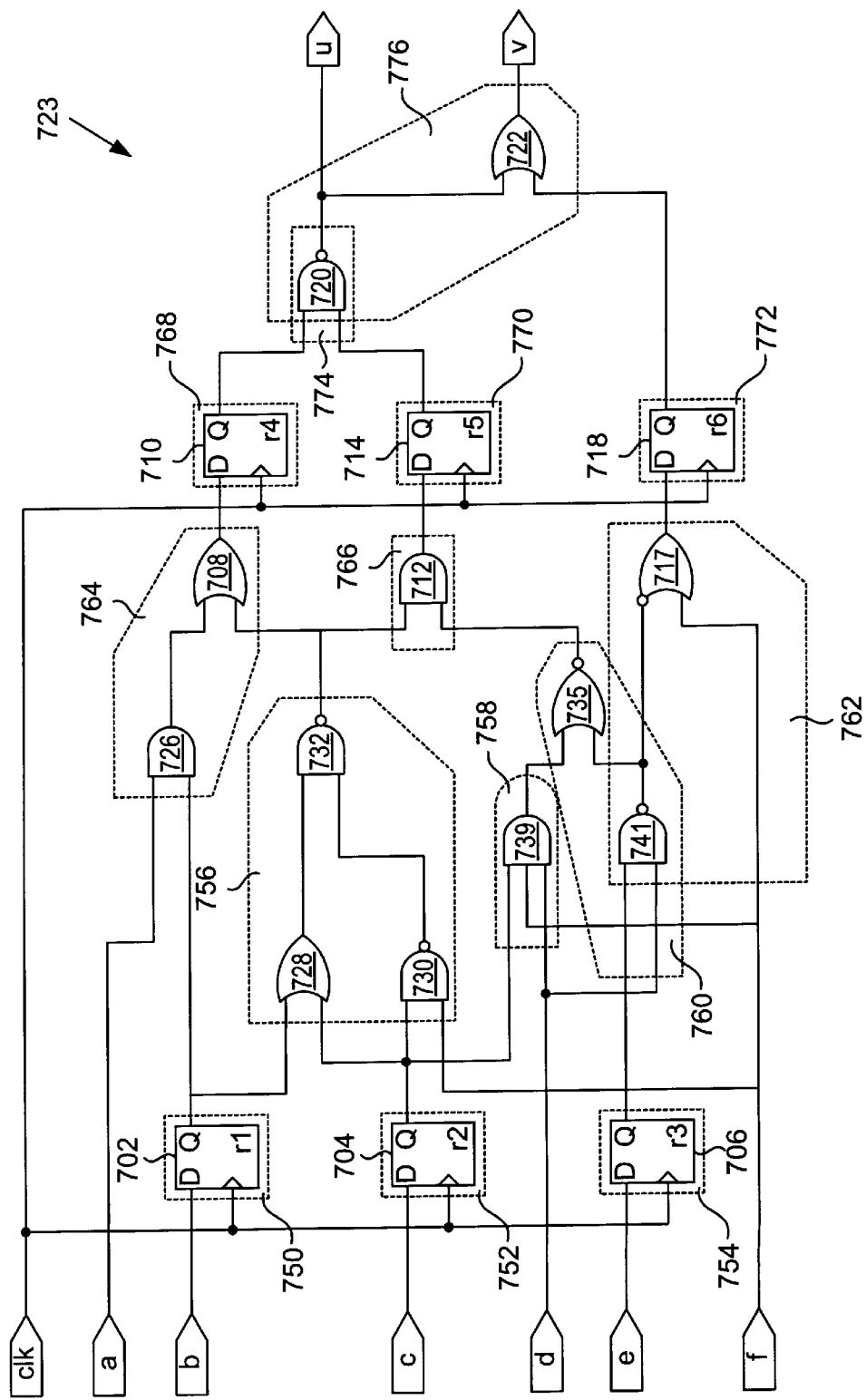

FIG. 7B presents a synthesized netlist 723 of the original design 700. As shown, many features of unsynthesized netlist 700 remain unchanged after synthesis. These unchanged nodes include registers 702, 704, 706, 710, 714, and 718. In addition, OR gate 708, AND gate 712, NAND gate 720, and OR gate 722 remain unchanged. Further, an AND gate 726, an OR gate 728, a NAND gate 730, and a NAND gate 732 remain unchanged.

While much of the unsynthesized netlist has remained unchanged during synthesis, one region of logic has been modified. That region includes, in unsynthesized netlist 700, an OR gate 734, an AND gate 738, a NAND gate 740, an AND gate 742, together with OR gate 716. As shown in FIG. 7B, this block of logic has been simplified to a NOR gate 735, an AND gate 739, a NAND gate 741, and a NOR gate 717 (negated input).

In synthesized netlist 723, the various nodes are mapped to logic cells delineated by dotted boundary lines. As shown, the logic of register 702 is mapped to a logic cell 750, the logic of register 704 is mapped to a logic cell 752, and the logic of register 706 is mapped to a logic cell 754. In addition, gates 728, 730, and 732 are mapped to a logic cell 756, gate 739 is mapped to a logic cell 758, gates 741 and 735 are mapped to a logic cell 760, gates 717 and 741 are mapped to a logic cell 762, gates 726 and 708 are mapped to a logic cell 764, gate 712 is mapped to a logic cell 766, register 710 is mapped to a logic cell 768, register 714 is mapped to a logic cell 770, register 718 is mapped to a logic cell 772, gate 720 is mapped to a logic cell 774, and gates 720 and 722 are mapped to a logic cell 776.

Figure 7C:
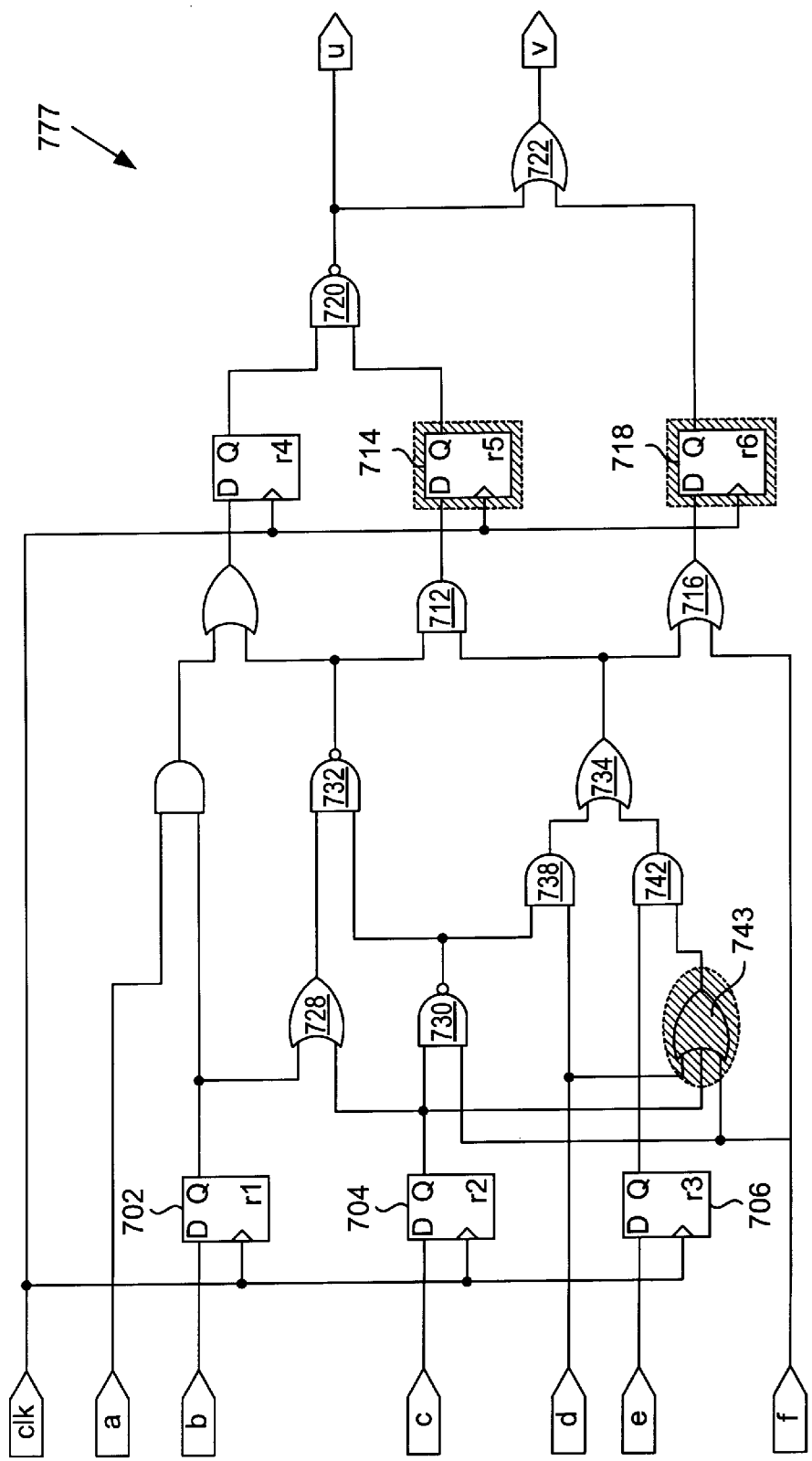

Turning now to FIG. 7C, an unsynthesized netlist 777 for a newly changed design is depicted. By comparing new unsynthesized netlist 777 with original unsynthesized netlist 700, it can be seen that a single "new gate" has been provided. Specifically, a new 3-input OR gate 743 replaces the 3-input NAND gate 740. Otherwise, netlists 777 and 700 are identical. In the above-described process, new OR gate 743 is identified at step 353 of process 316 (FIG. 3B). By virtue of being a new gate, OR gate 743 is added to the sub-netlist.

As indicated in process 400, step 404, the external gates of netlist 777 must be identified. In netlist 777, the external gates include the clock input, input pins "a" through "f," registers 702, 704, 706, 710, 714, and 718, and output pins "u" and "v."

Next, as indicated in process 400, step 408, the external nodes fed by new gate 743 must be identified. This is accomplished by tracing the output of OR gate 743 through AND gate 742, OR gate 734, and AND gate 712. The output of AND gate 712 feeds external register 714. Therefore, register 714 is marked as a modified external node and added to the sub-netlist. Similarly, tracing the output of new gate 743 through OR gate 734, the output path traces through OR gate 716 and to register 718. Therefore, register 718 is marked as a modified external gate and added to the sub-netlist. No other external nodes are fed by new gate 743. Note that, according to step 410, the external gates 714 and 718 are also marked in synthesized netlist 723.

Now, as indicated at step 418 of process 400, the compiler recurses backwards from each of modified external node 714 and 718 until it reaches an external node on each of the recursion paths.

Starting with register 718, the backward recursion process proceeds as follows. Register 718 is fed by OR gate 716. Therefore, OR gate 716 is marked as modified and added to the sub-netlist. OR gate 716 has two inputs. The lower input is fed by an external node, input pin "f." Therefore, the recursion ends with respect to this input to OR gate 716. However, the upper input to gate 716 is fed by OR gate 734. Therefore, OR gate 734 is marked as modified and added to the sub-netlist. OR gate 734 is, in turn, fed by AND gates 742 and 738. Therefore, the compiler adds these AND gates to the sub-netlist. AND gate 742 is fed by register 706, an external node. It is also fed by new OR gate 743. Because OR gate 743 is already present in the sub-netlist by virtue of being a new gate, it need not be readded to the sub-netlist. However, the inputs to the gate 743 must be considered. As shown, gate 743 is fed by register 704 and input pins "d" and "f." As each of these are external nodes, the recursion down this signal path proceeds no further. Returning to modified AND gate 738, it has two inputs which must be analyzed. One input goes to input pin "d," and so this recursion path is followed no further. The other input pin of gate 738 is fed by NAND gate 730. Thus, gate 730 is marked as modified and added to the sub-netlist. NAND gate 730 is, in turn, fed by register 704 and input pin "f." At this point, all signal paths back from external node 718 have been traced to completion.

Considering now modified external node 714, it is fed by AND gate 712. Therefore, gate 712 must be marked as modified and added to the sub-netlist. Gate 712 has two inputs. The first is fed by OR gate 734 which was previously passed through during recursion from modified external node 718. Therefore, the path through gate 734 need not be considered again. The other input to AND gate 712 is fed by NAND gate 732. Thus, gate 732 is added to the sub-netlist. It is, in turn, fed by NAND gate 730 which was previously considered. It is also fed by OR gate 728 which has as inputs register 702 and 704, external nodes. At this point, OR gate 728 is added to the sub-netlist and the recursion back from modified internal register 714 is completed.

As a result of the backward recursion step 418 as applied to netlist 777, a sub-netlist has been generated. The sub-netlist includes the following nodes: registers 714 and 718, date 716, gate 734, gate 742, gate 743, gate 738, gate 730, gate 712, gate 732, and gate 728. This sub-netlist must now be resynthesized and then placed at the appropriate location within previously synthesized netlist 723.

Figure 7D:
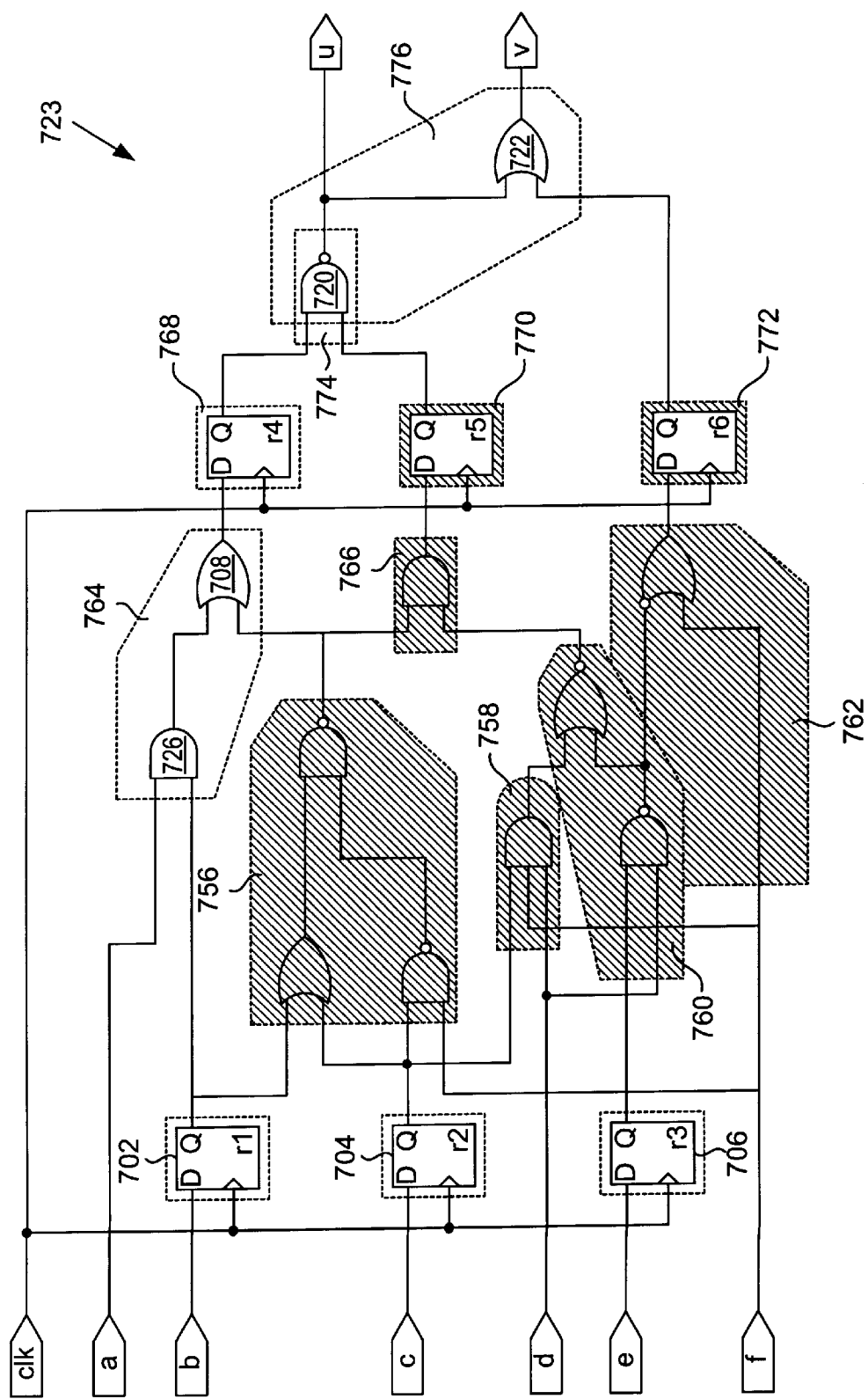

FIG. 7D highlights the regions of synthesized netlist 723 that are to be replaced by the synthesized sub-netlist. These are defined by the modified external gates at the output side (registers 770 and 772 which are included in the sub-netlist) and by the other marked external gates identified during the backward recursion (registers 702, 704, and 706, together with input pins "d" and "f" which are not included in the sub-netlist). As shown in FIG. 7D, the logic implemented in logic cells 756, 758, 760, 762, 766, 770, and 772 is to be replaced the synthesized sub-netlist.

After the synthesized sub-netlist is inserted into netlist 723, this new netlist may be compared by netlist differencing with original netlist 723 to identify changed nodes. The changed nodes so identified must then be mapped into logic cells and the resulting design partitioned and fit.

Figure 7E:
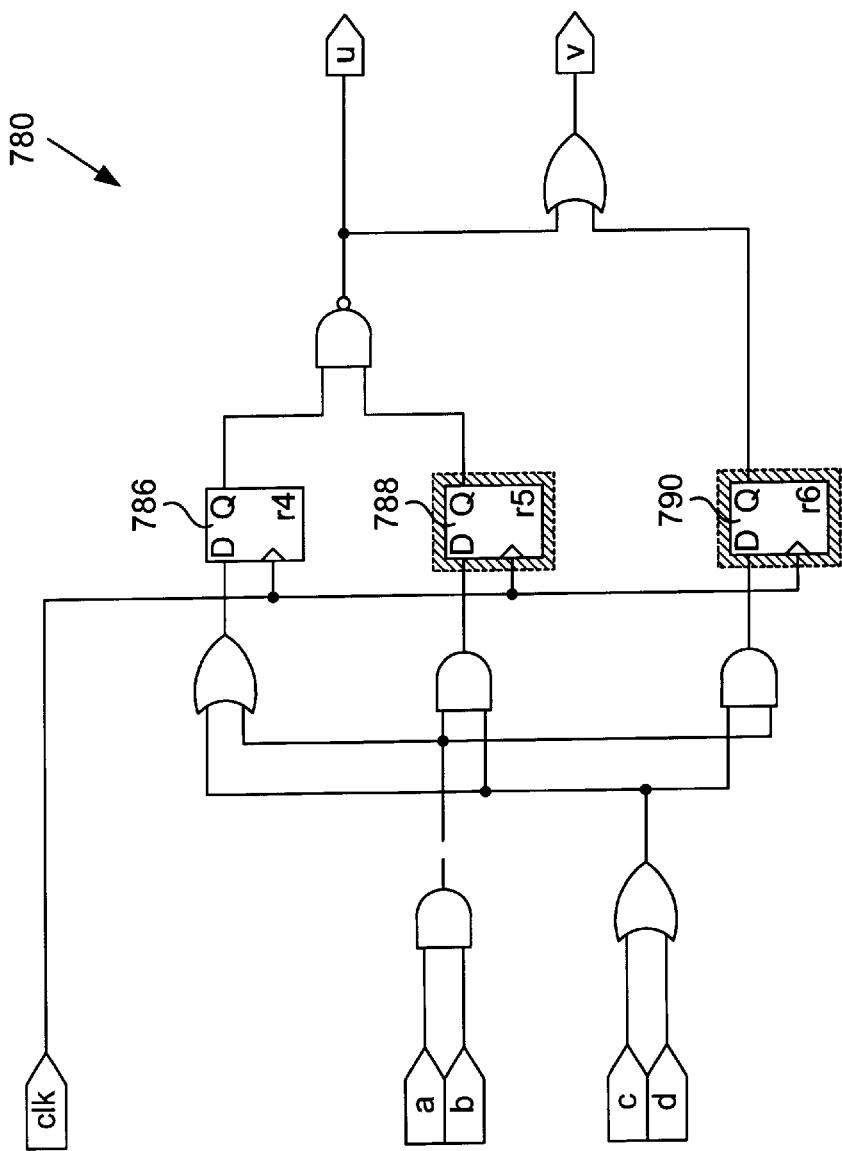
FIGS. 7E and 7F are gate-level representations illustrating the distinction between hard and soft registers for use with the methods of this invention.
Figure 7F:
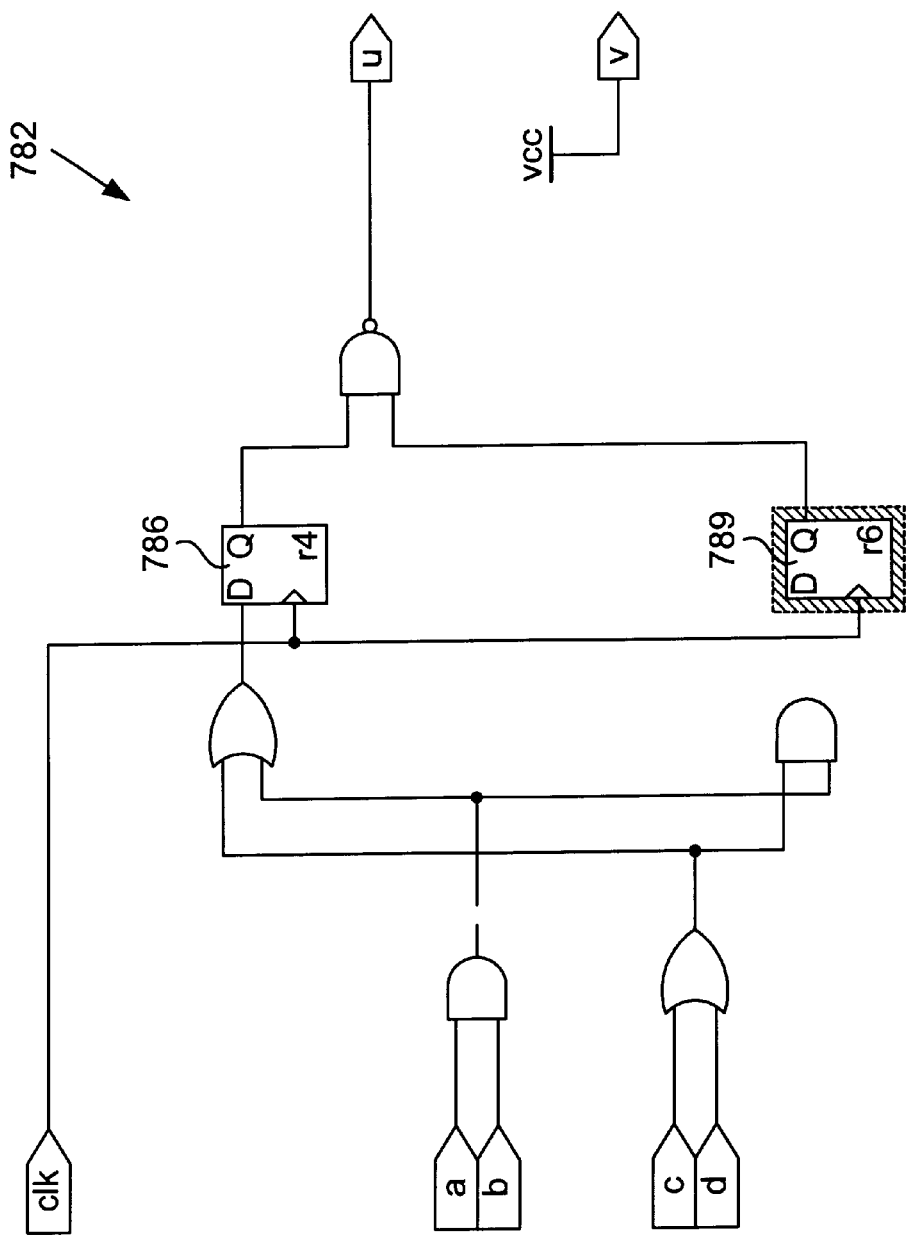

FIGS. 7E and 7F illustrate how hard registers can be distinguished from soft registers. Remember that hard registers can serve as external nodes for purposes of identifying a sub-netlist. FIG. 7E presents an unsynthesized netlist 780 of an electronic design and FIG. 7F presents a synthesized netlist 782 of the same electronic design.

As mentioned, hard registers are only those registers that are not modified during synthesis. As shown in FIGS. 7E and 7F, a register 786 remains unchanged during synthesis. Therefore, it qualifies as a hard gate, and possibly as an external gate. In contrast, registers 788 and 790 are functionally the same. This means that register 790 can be substituted wherever register 788 appears and vice versa. Thus, during synthesis, the functions of registers 788 and 790 are combined by duplicate register extraction to a register 789. Neither register 788 nor register 790 qualifies as a hard gate. Note that the duplicate register extraction causes output pin v to reduce to VCC.

4. Computer System Embodiment

Embodiments of the present invention as described above employ various process steps involving data stored in computer systems. These steps are those requiring physical manipulation of physical quantities. Usually, though not necessarily, these quantities take the form of electrical or magnetic signals capable of being stored, transferred, combined, compared, and otherwise manipulated. It is sometimes convenient, principally for reasons of common usage, to refer to these signals as bits, values, elements, variables, characters, data structures, or the like. It should be remembered, however, that all of these and similar terms are to be associated with the appropriate physical quantities and are merely convenient labels applied to these quantities.

Further, the manipulations performed are often referred to in terms such as identifying, fitting, or comparing. In any of the operations described herein that form part of the present invention these operations are machine operations. Useful machines for performing the operations of embodiments of the present invention include general purpose digital computers or other similar devices. In all cases, there should be borne in mind the distinction between the method of operations in operating a computer and the method of computation itself. Embodiments of the present invention relate to method steps for operating a computer in processing electrical or other physical signals to generate other desired physical signals.

Embodiments of the present invention also relate to an apparatus for performing these operations. This apparatus may be specially constructed for the required purposes, or it may be a general purpose computer selectively activated or reconfigured by a computer program stored in the computer. The processes presented herein are not inherently related to any particular computer or other apparatus. In particular, various general purpose machines may be used with programs written in accordance with the teachings herein, or it may be more convenient to construct a more specialized apparatus to perform the required method steps. The required structure for a variety of these machines will appear from the description given above.

In addition, embodiments of the present invention further relate to computer readable media that include program instructions for performing various computer-implemented operations. The media and program instructions may be those specially designed and constructed for the purposes of the present invention, or they may be of the kind well known and available to those having skill in the computer software arts. Examples of computer-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Figure 8:
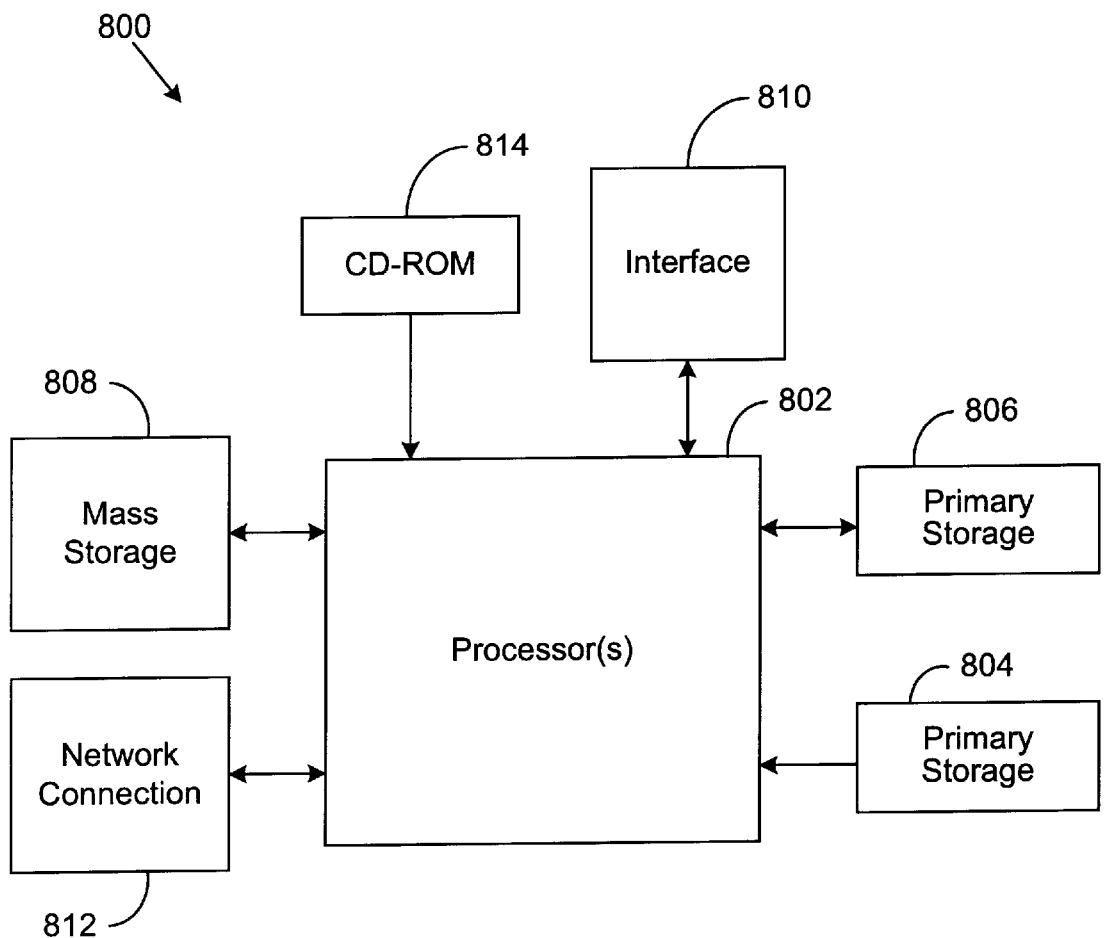
FIG. 8 is a block diagram of a typical computer system suitable for implementing an embodiment of the present invention.

FIG. 8 illustrates a typical computer system in accordance with an embodiment of the present invention. The computer system 800 includes any number of processors 802 (also referred to as central processing units, or CPUs) that are coupled to storage devices including primary storage 806 (typically a random access memory, or RAM), primary storage 804 (typically a read only memory, or ROM). As is well known in the art, primary storage 804 acts to transfer data and instructions uni-directionally to the CPU and primary storage 806 is used typically to transfer data and instructions in a bi-directional manner. Both of these primary storage devices may include any suitable of the computer-readable media described above. A mass storage device 808 is also coupled bi-directionally to CPU 802 and provides additional data storage capacity and may include any of the computer-readable media described above. The mass storage device 808 may be used to store programs, data and the like and is typically a secondary storage medium such as a hard disk that is slower than primary storage. It will be appreciated that the information retained within the mass storage device 808, may, in appropriate cases, be incorporated in standard fashion as part of primary storage 806 as virtual memory. A specific mass storage device such as CD-ROM 814 may also pass data uni-directionally to the CPU.

CPU 802 is also coupled to an interface 810 that includes one or more input/output devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 802 optionally may be coupled to a computer or telecommunications network using a network connection as shown generally at 812. With such a network connection, it is contemplated that the CPU might receive information from the network, or might output information to the network in the course of performing the above-described method steps. The above-described devices and materials will be familiar to those of skill in the computer hardware and software arts.

Figure 9:
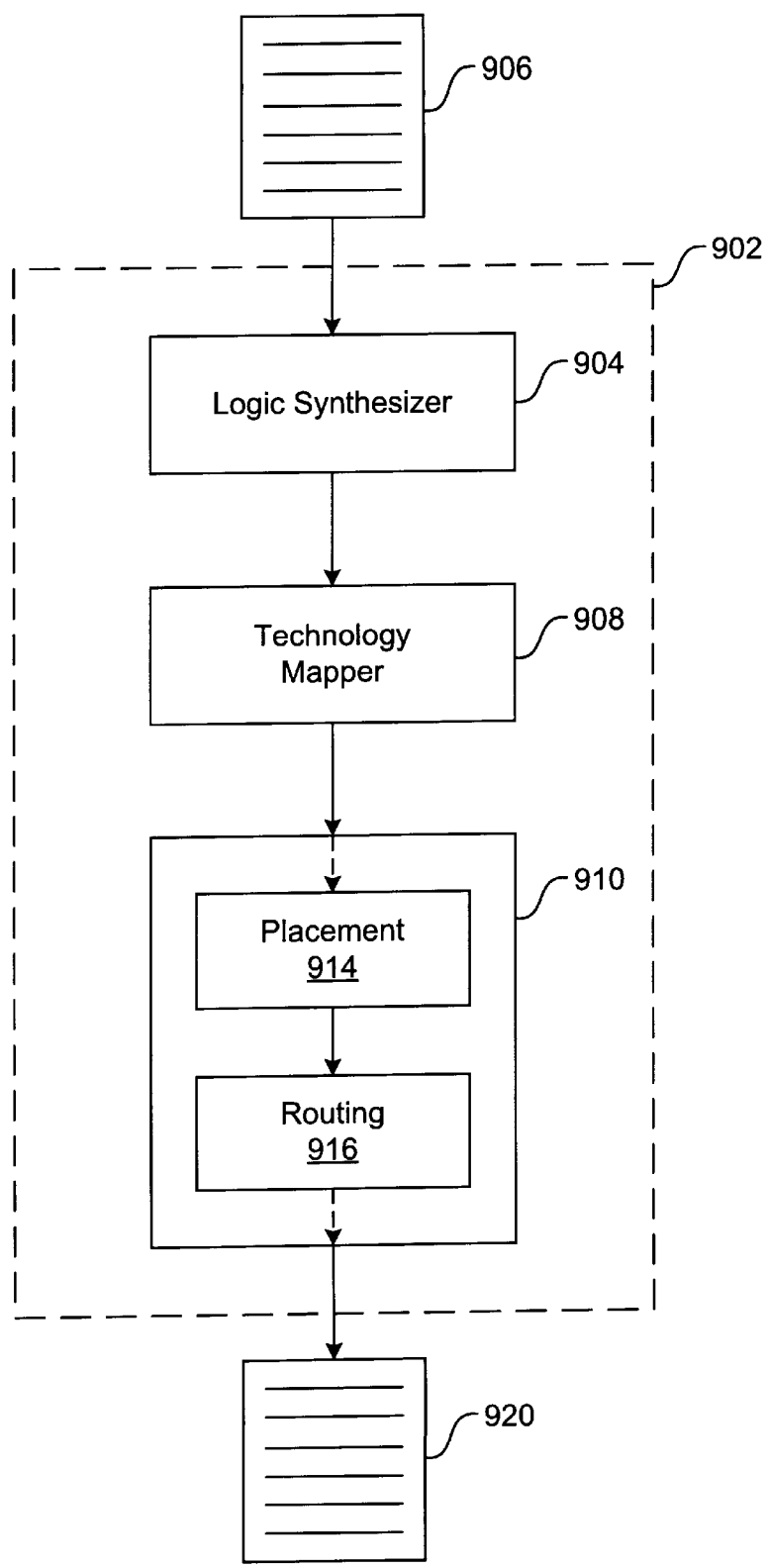
FIG. 9 is a block diagram showing modules that may be employed in a PLD design compiler of this invention.

The hardware elements described above may define multiple software modules for performing the operations of this invention. For example, instructions for running a compiler may be stored on mass storage device 808 or 814 and executed on CPU 808 in conjunction with primary memory 806. In a preferred embodiment, the compiler is divided into software submodules. Referring to FIG. 9, a compiler 902 includes a logic synthesizer 904 which creates a synthesized netlist from a user's high level electronic design 906. Compiler 902 also includes a technology mapper 908 which maps gates from the synthesized netlist into logic cells. Finally, compiler 902 includes a place and route module 910 which in turn includes a placement module 914 and a routing module 916. Placement module 914 places logic cells onto specific logic elements of a target hardware device. Routing module 916 connects wires between the inputs and outputs of the various logic elements in accordance with the logic required to implement the electronic design. Compiler 902 outputs a compiled design 920. It should be understood that other compiler designs may be employed with this invention. For example, some compilers will include a partitioning module to partition a technology mapped design onto multiple hardware entities. In addition, the compiler may be adapted to handle hierarchical designs, whereby synthesis, mapping, etc. are performed recursively as the compiler moves down branches of a hierarchy tree. Additional details of compiler software for PLDs may be found in U.S. Provisional Application No. 60/062,036 (attorney docket no. ALTRP033/A404), naming D. Mendel as inventor, and entitled "PARALLEL PROCESSING FOR COMPUTER ASSISTED DESIGN OF ELECTRONIC DEVICES."

Figure 10:
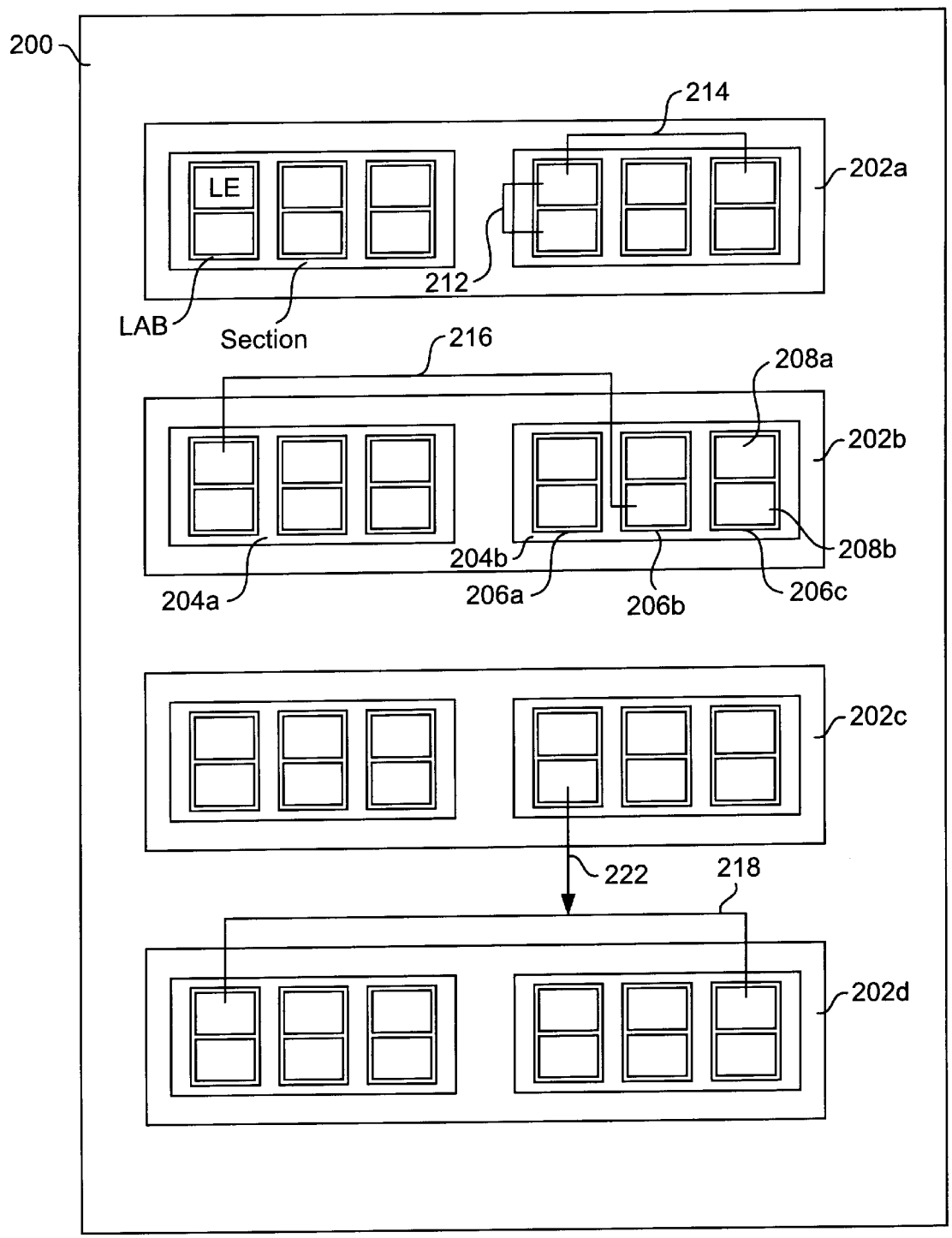
FIG. 10 is an idealized block representation of the architecture of an arbitrary hardware device, including interconnects, which may be employed in fitting gates from synthesized sub-netlist generated in accordance with this invention.

The form of a compiled design may be further understood with reference to a hypothetical target hardware device having multiple hierarchical levels. Such a hardware device is represented in FIG. 10. This idealized representation roughly conforms to the layout of a FLEX 10K programmable logic device available from Altera Corporation of San Jose, Calif. In FIG. 10, a programmable logic device 200 is segmented into a plurality of "rows" to facilitate interconnection between logic elements on a given row. In the hypothetical example shown, there are four rows: 202a, 202b, 202c, and 202d.

Each row of programmable logic device 200 is further subdivided into two "half-rows." For example, row 202b is shown to contain a half-row 204a and a half-row 204b. The next lower level of the hierarchy is the "logic array block" (LAB). Half-row 204b, for example, contains three LABs: and LAB 206a, an LAB 206b, and an LAB 206c. Finally, at the base of the of the hierarchy are several logic elements. Each such logic element exists within a single logic array block. For example, LAB 206c includes two logic elements: a logic element 208a and a logic element 208b.

In short, PLD 200 includes four hierarchical levels: (1) rows, (2) half-rows, (3) LABs, and (4) logic elements. Any logic element within PLD 200 can be uniquely specified (and located) by specifying a value for each of these four levels of the containment hierarchy. For example, logic element 208b can be specified as follows: row (2), half-row (2), LAB (3), LE (2).

To fit a logic design onto a target hardware device such as that shown in FIG. 10, a synthesized netlist is divided into logic cells (typically containing one or more gates) which are placed in the various logic elements as uniquely defined above. Thus, each logic cell from the synthesized netlist resides in a unique single logic element.

Often, a multi-level hardware hierarchy such as that shown in PLD 200 includes multiple levels of routing lines (interconnects). These connect the uniquely placed logic cells to complete circuits. In PLD 200, for example, four levels of interconnect are provided, one for each of the four hierarchy levels. First a local interconnect such as interconnect 212 is employed to connect two logic elements within the same LAB. At the next level, a LAB-to-LAB interconnect such as interconnect 214 is employed to connect two LABs within the same half-row. At the next higher level, a "global horizontal" interconnect is employed to connect logic elements lying in the same row but in different half-rows. An example of a global horizontal interconnect is interconnect 216 shown in row 202b. Another global horizontal interconnect is shown as interconnect 218, linking logic elements within row 202d. Finally, a "global vertical" interconnect is employed to link a logic element in one row with a logic element in a different row. For example, a global vertical interconnect 222 connects a logic element in the first LAB of the second half-row of row 202c to two separate logic elements in row 202d. In the embodiment shown, this is accomplished by providing global vertical interconnect 202 between the above-described logic element in row 202c to global horizontal interconnect 218 in row 202d. Consistent with the architecture of Altera Corporation's FLEX 10K CPLD, global vertical interconnects are directly coupled to the logic element transmitting a signal and indirectly coupled (through a global horizontal interconnect) to the logic elements receiving the transmitted signal.

In a target hardware device, there will be many paths available for routing a give signal line. During the routing state, these various possible routing paths must be evaluated to determine which is best for the design being fit.

The interconnect structure and overall architecture of the Altera FLEX 10K family of PLDs is described in much greater detail in U.S. Pat. No. 5,550,782, issued on Aug. 27, 1996, naming Cliff et al. as inventors, and entitled "PROGRAMMABLE LOGIC ARRAY INTEGRATED CIRCUITS." That application is incorporated herein by reference for all purposes. Additional discussion of the FLEX 10K and other PLD products may be found in the Altera 1996 Data Book, available from Altera Corporation of San Jose, Calif. The Data Book is incorporated herein by reference for all purposes.

Briefly, in the FLEX 10K architecture, there are at least three rows, with two half-rows per row, and twelve LABs per half-row. Each LAB includes eight logic elements each of which, in turn, includes a 4-input look-up table, a programmable flip-flop, and dedicated signal paths for carry and cascade functions. The eight logic elements in an LAB can be used to create medium-sized blocks of logic—such as 8-bit counters, address decoders, or state machines—or combined across LABs to create larger logic blocks.

It should be understood that the present invention is not limited to the Altera FLEX 10K architecture or any other hardware architecture for that matter. In fact, it is not even limited to programmable logic devices. It may be employed generically in target hardware devices as broadly defined above and preferably in application specific integrated circuit designs. PLDs are just one example of ASICs that can benefit from application of the present invention.

Figure 11:
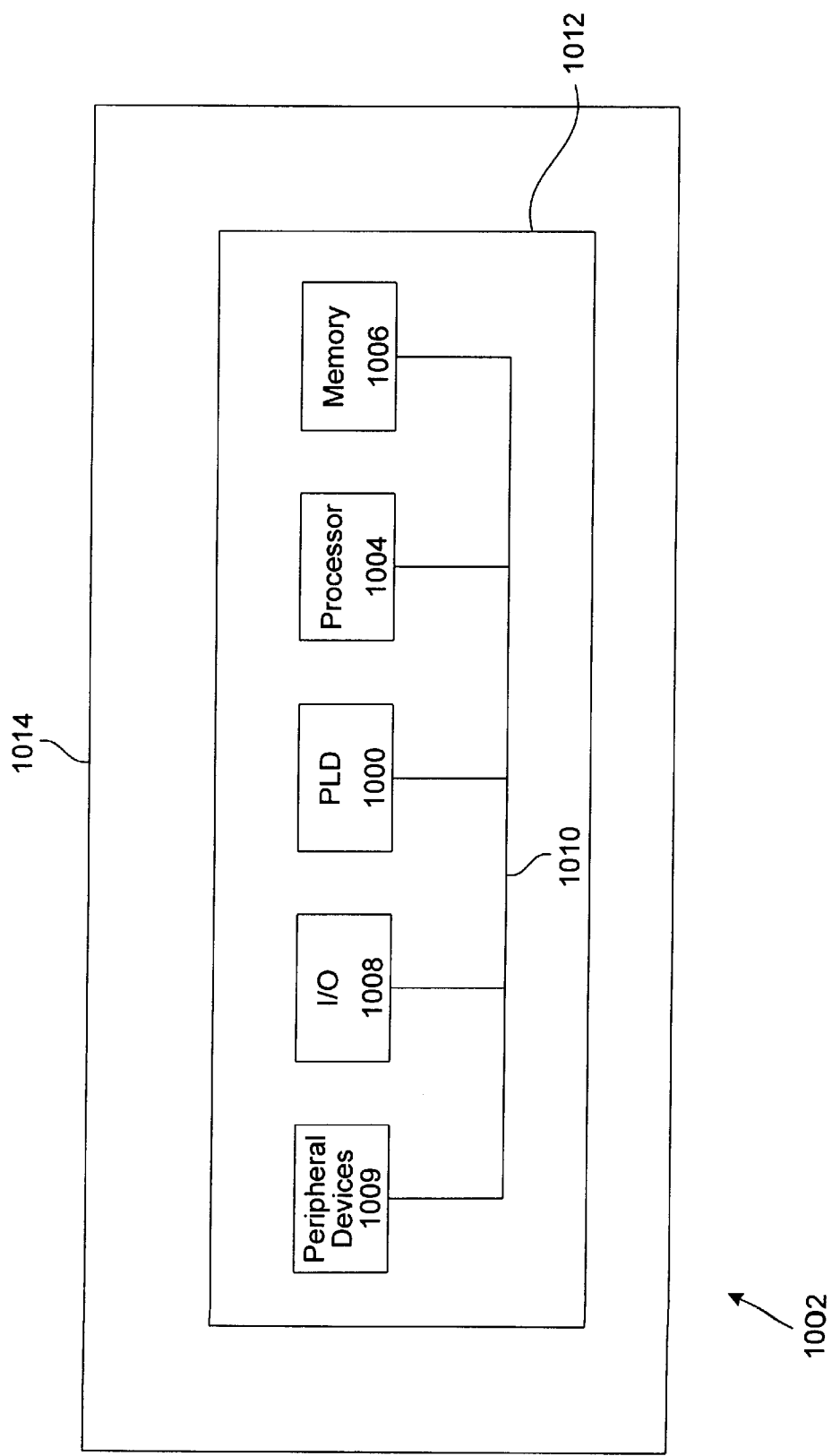
FIG. 11 is a block diagram depicting a system containing a PLD prepared in accordance with this invention.

This invention also relates to programmable logic devices programmed with a design prepared in accordance with the above described methods. The invention further relates to systems employing such programmable logic devices. FIG. 11 illustrates a PLD 1000 of the present invention in a data processing system 1002. The data processing system 1002 may include one or more of the following components: a processor 1004; memory 1006; I/O circuitry 1008; and peripheral devices 1009. These components are coupled together by a system bus 1010 and are populated on a circuit board 1012 which is contained in an end-user system 1014.

The system 1002 can be used in a wide variety of applications, such as computer networking, data networking, instrumentation, video processing, digital signal processing, or any other application where the advantage of using reprogrammable logic is desirable. The PLD 1000 can be used to perform a variety of different logic functions. For example, PLD 1000 can be configured as a processor or controller that works in cooperation with processor 1004. The PLD 1000 may also be used as an arbiter for arbitrating access to a shared resource in the system 1002. In yet another example, the PLD 1000 can be configured as an interface between the processor 1004 and one of the other components in the system 1002. It should be noted that the system 1002 is only exemplary, and that the true scope and spirit of the invention should be indicated by the following claims.

5. Other Embodiments

The foregoing describes the instant invention and its presently preferred embodiments. Numerous modifications and variations in the practice of this invention are expected to occur to those skilled in the art. For instance, the present invention may be implemented on one computer having one processor, on one computer having multiple processors, or on different computers, and may take the form of instructions transmitted via a network connection such as an intranet or internet. In addition, the technique and system of the present invention is suitable for use with a wide variety of EDA tools and methodologies for programming a device. Therefore, the described embodiments should be taken as illustrative and not restrictive, and the invention should not be limited to the details given herein but should be defined by the following claims and their full scope of equivalents.

What is claimed is:

1. In a compiler that compiles an electronic design for implementation on a target hardware device, a method of identifying a changed portion of a changed electronic design which is changed from an original electronic design that was previously compiled, the changed electronic design including an unchanged portion which is unchanged from the original electronic design and the changed portion which is changed from the original electronic design, the method comprising:

(a) identifying one or more new logic nodes in the changed electronic design that have been directly changed from the original electronic design; and (b) tracing a signal propagation path in a netlist forward between at least one output of the new logic nodes and one or more external nodes and backward between at least one input of the new logic nodes and one or more external nodes, which external nodes include hard register and I/O pins, such that nodes encountered on the signal propagation path are designated as affected nodes;

wherein the changed portion of the changed electronic design includes both the new logic nodes and the affected nodes.

2. The method of claim 1, wherein the target hardware device is an Application Specific Integrated Circuit.

3. The method of claim 2, wherein the target hardware device is a Programmable Logic Device.

4. The method of claim 1, wherein the new logic nodes and the affected logic nodes form at least part of a netlist.

5. The method of claim 4, wherein the netlist is unsynthesized.

6. The method of claim 1, further comprising:

comparing an unsynthesized netlist of the changed electronic design with a synthesized netlist of the original electronic design to identify as external nodes those hard registers and I/O pins which are (i) common between the unsynthesized netlist and the synthesized netlist and (ii) output a common signal.

7. The method of claim 1, further comprising:

(c) synthesizing the changed portion of the changed electronic design to produce a synthesized changed portion;

(d) incorporating the synthesized changed portion in a synthesized netlist of the original design.

8. A machine readable medium containing instructions for operating a compiler that compiles an electronic design for implementation on a target hardware device, the instructions controlling identification of a changed portion of a changed electronic design which is changed from an original electronic design that was previously compiled, the changed electronic design including an unchanged portion which is unchanged from the original electronic design and the changed portion which is changed from the original electronic design, the instructions specifying operations comprising:

(a) identifying one or more new logic nodes in the changed electronic design that have been directly changed from the original electronic design; and (b) tracing a signal propagation path in a netlist forward between at least one output of the new logic nodes and one or more external nodes and backward between at least one input of the new logic nodes and one or more external nodes, which external nodes include hard registers and I/O pins, such that nodes encountered on the signal propagation path are designated as affected nodes;

wherein the changed portion of the changed electronic design includes both the new logic nodes and the affected nodes.

9. The machine readable medium of claim 8, wherein the new logic nodes and the affected logic nodes form at least part of a netlist.

10. The machine readable medium of claim 9, wherein the netlist is unsynthesized.

11. The machine readable medium of claim 8, wherein the instructions further comprise:

comparing an unsynthesized netlist of the changed electronic design with a synthesized netlist of the original electronic design to identify as external nodes those hard registers and I/O pins which are (i) common between the unsynthesized netlist and the synthesized netlist and (ii) output a common signal.

12. The machine readable medium of claim 8, wherein the instructions further comprise:

(c) synthesizing the changed portion of the changed electronic design to produce a synthesized changed portion;

(d) incorporating the synthesized changed portion in a synthesized netlist of the original design.

13. In a compiler that compiles an electronic design for implementation on a target hardware device, a method of incrementally recompiling a changed electronic design which is changed from an original electronic design that was previously compiled, the changed electronic design including an unchanged portion which is unchanged from the original electronic design and a changed portion which is changed from the original electronic design, the method comprising:

(a) receiving an unsynthesized netlist for the original electronic design, a synthesized netlist for the original electronic design, and an unsynthesized netlist for the changed electronic design;

(b) identifying one or more new logic nodes in the unsynthesized netlist for the changed electronic design that have been directly changed from the unsynthesized netlist for the original electronic design;

(c) in the unsynthesized netlist for the changed electronic design, tracing signal propagation paths between at least one of the new logic nodes and one or more external nodes, which external nodes include hard registers and I/O pins, such that nodes encountered on the signal propagation path are designated as affected nodes which together with the one or more new logic nodes comprise the changed portion of the unsynthesized netlist for the changed electronic design;

(d) synthesizing the changed portion of the unsynthesized netlist for the changed electronic design to produce a synthesized changed portion;

(e) incorporating the synthesized changed portion in the synthesized netlist for the original design to produce a synthesized netlist for the changed electronic design; and (f) completing compilation of the synthesized netlist for the changed electronic design.

14. A programmable logic device the changed electronic design compiled according to the method of claim 13.

15. The method of claim 13, wherein the target hardware device is an Application Specific Integrated Circuit.

16. The method of claim 15, wherein the target hardware device is a Programmable Logic Device.

17. The method of claim 13, further comprising:

prior to performing (c), comparing the unsynthesized netlist of the changed electronic design with the synthesized netlist of the original electronic design to identify as external nodes those hard registers and I/O pins which are (i) common between the unsynthesized netlist of the changed electronic design and the synthesized netlist of the original electronic design and (ii) output a common signal.

18. The method of claim 13, wherein (d) is performed without synthesizing the unchanged portion of the changed electronic design.

19. The method of claim 13, further comprising:

after performing (d), identifying one or more new synthesized logic nodes in the synthesized netlist for the changed electronic design that have been directly changed from the synthesized netlist for the original electronic design, wherein (f) is limited to a portion of the synthesized netlist for the changed electronic design, which portion is delineated by the new synthesized logic nodes.

20. The method of claim 13, wherein tracing signal propagation paths comprises tracing a path forward from an output of a new logic node to one or more external nodes.

21. The method of claim 13, wherein tracing signal propagation paths comprises tracing a path backward from an input of a new logic node to one or more external nodes.

22. A machine readable medium containing instructions for operating a compiler that compiles an electronic design for implementation on a target hardware device, the instructions controlling incrementally recompiling a changed electronic design which is changed from an original electronic design that was previously compiled, the changed electronic design including an unchanged portion which is unchanged from the original electronic design and a changed portion which is changed from the original electronic design, the instructions specifying operations comprising:

(a) receiving an unsynthesized netlist for the original electronic design, a synthesized netlist for the original electronic design, and an unsynthesized netlist for the changed electronic design;

(b) identifying one or more new logic nodes in the unsynthesized netlist for the changed electronic design that have been directly changed from the unsynthesized netlist for the original electronic design;

(c) in the unsynthesized netlist for the changed electronic design, tracing signal propagation paths between at least one of the new logic nodes and one or more external nodes, which external nodes include hard registers and I/O pins, such that nodes encountered on the signal propagation path are designated as affected nodes which together with the one or more new logic nodes comprise the changed portion of the unsynthesized netlist for the changed electronic design;

(d) synthesizing the changed portion of the unsynthesized netlist for the changed electronic design to produce a synthesized changed portion;

(e) incorporating the synthesized changed portion in the synthesized netlist for the original design to produce a synthesized netlist for the changed electronic design; and (f) completing compilation of the synthesized netlist for the changed electronic design.

23. The machine readable medium of claim 22, wherein the instructions further comprise:

after performing (d), identifying one or more new synthesized logic nodes in the synthesized netlist for the changed electronic design that have been directly changed from the synthesized netlist for the original electronic design, wherein (f) is limited a portion of the synthesized netlist for the changed electronic design, which portion is delineated by the new synthesized logic nodes.

24. The machine readable medium of claim 22, wherein the instructions specify that tracing signal propagation paths comprises tracing a path forward from an output of a new logic node to one or more external nodes.

25. The machine readable medium of claim 22, wherein the instructions specify that tracing signal propagation paths comprises tracing a path backward from an input of a new logic node to one or more external nodes.

26. The machine readable medium of claim 22, wherein the instructions further comprise:

prior to performing (c), comparing the unsynthesized netlist of the changed electronic design with the synthesized netlist of the original electronic design to identify as external nodes those hard registers and I/O pins which are (i) common between the unsynthesized netlist of the changed electronic design and the synthesized netlist of the original electronic design and (ii) output a common signal.

27. The machine readable medium of claim 22, wherein the instructions specify that (d) is performed without synthesizing the unchanged portion of the changed electronic design.

* * * * *